(12) United States Patent
Ganiger et al.

(10) Patent No.: US 11,988,096 B2
(45) Date of Patent: May 21, 2024

(54) SEAL ASSEMBLIES FOR TURBINE ENGINES AND RELATED METHODS

(71) Applicants: General Electric Company, Schenectady, NY (US); General Electric Deutschland Holding GmbH, Frankfurt (DE)

(72) Inventors: Ravindra Shankar Ganiger, Bangalore (IN); Neelesh Nandkumar Sarawate, Niskayuna, NY (US); Rahul Anil Bidkar, Clifton Park, NY (US); Narendra Anand Hardikar, Bangalore (IN); Kevin Randall McManus, Liberty Township, OH (US); Steven Douglas Johnson, Milford, OH (US); Prateek Jalan, Bangalore (IN); Antonio Guijarro Valencia, Munich (DE); Julius John Montgomery, Mason, OH (US); Rodrigo Rodriguez Erdmenger, Munich (DE); Jose Maria Rey Villazon, Ismaning (DE)

(73) Assignees: General Electric Company, Schenectady, NY (US); General Electric Deutschland Holding GmbH, Frankfurt (DE)

(*) Notice: Subject to any disclaimer, the term of this patent is extended or adjusted under 35 U.S.C. 154(b) by 0 days.

(21) Appl. No.: 17/841,847

(22) Filed: Jun. 16, 2022

(65) Prior Publication Data
US 2023/0279781 A1    Sep. 7, 2023

(30) Foreign Application Priority Data
Mar. 3, 2022    (IN) .............................. 202211011484

(51) Int. Cl.
*F01D 11/00*    (2006.01)
*F01D 11/02*    (2006.01)

(52) U.S. Cl.
CPC .......... *F01D 11/003* (2013.01); *F01D 11/001* (2013.01); *F01D 11/02* (2013.01); *F05D 2220/323* (2013.01); *F05D 2240/56* (2013.01)

(58) Field of Classification Search
CPC ...... F01D 11/00; F01D 11/001; F01D 11/003; F01D 11/02; F01D 11/025; F01D 11/04;
(Continued)

(56) References Cited

U.S. PATENT DOCUMENTS 2,463,714 A * 3/1949 Peterson .................. F16J 15/36
277/369
2,866,655 A    12/1958 Stanbro
(Continued)

FOREIGN PATENT DOCUMENTS

CA    2521148 C  * 11/2006  ........... F01D 21/045
DE    3627053 A1    2/1988
(Continued)

OTHER PUBLICATIONS

Chupp et al., Sealing in Turbomachinery, NASA/TM-2006-214341, Aug. 2006, 62 Pages. https://ntrs.nasa.gov/api/citations/20060051674/downloads/20060051674.pdf.
(Continued)

*Primary Examiner* — Nathan Cumar
(74) *Attorney, Agent, or Firm* — Dority & Manning, P.A.

(57) ABSTRACT

A seal assembly for a rotary machine, such as a turbine engine, may include a seal rotor comprising a rotor face, a seal slider comprising a slider face, a seal stator, wherein the seal slider is slidably coupled to the seal stator, and wherein the slider face and the rotor face define a primary seal. The seal slider may be configured to slidably engage and retract
(Continued)

the slider face with respect to the rotor face. The seal assembly may further include a secondary seal disposed between the seal slider and the seal stator. The secondary seal may be configured to compress and rebound and/or to expand and rebound, over at least a portion of a range of motion of the seal slider.

17 Claims, 10 Drawing Sheets

(58) Field of Classification Search
CPC .................. F01D 11/06; F05D 2220/00; F05D 2220/323; F05D 2240/00; F05D 2240/55; F05D 2240/56; F05D 2240/57; F05D 2240/58
USPC .......................................................... 277/412
See application file for complete search history.

(56) References Cited

U.S. PATENT DOCUMENTS

| | | | |
|---|---|---|---|
| 4,365,816 A | 12/1982 | Johnson et al. | |
| 4,688,806 A | 8/1987 | Heilala | |
| 4,744,569 A | 5/1988 | Wentworth, Jr. | |
| 6,213,472 B1 | 4/2001 | Bondarenko et al. | |
| 6,311,983 B1* | 11/2001 | Burcham | F16J 15/44 415/113 |
| 6,789,803 B2 | 9/2004 | Radosav | |
| 7,611,151 B2 | 11/2009 | Casucci et al. | |
| 8,714,558 B2 | 5/2014 | Berard | |
| 9,004,495 B2 | 4/2015 | Vasagar | |
| 9,291,269 B2 | 3/2016 | Jahn et al. | |
| 10,012,315 B2 | 7/2018 | Barger et al. | |
| 10,119,616 B2 | 11/2018 | Tanju | |
| 11,028,927 B2 | 6/2021 | Lewis | |
| 2004/0155410 A1* | 8/2004 | Proctor | F16J 15/164 277/409 |
| 2020/0166142 A1 | 5/2020 | Bidkar et al. | |
| 2020/0166143 A1* | 5/2020 | Tran | F16J 15/40 |

FOREIGN PATENT DOCUMENTS

| | | | | |
|---|---|---|---|---|
| DE | 102008048943 A1 * | 4/2010 | | F16J 15/004 |
| EP | 3069055 A1 | 9/2016 | | |
| WO | WO2020126071 | 6/2020 | | |

OTHER PUBLICATIONS

7 Things to Know Before Selecting Welded Metal Bellows Seals for your Application, John Crane—a Smiths Company, Feb. 25, 2020, 6 Pages. https://www.johncrane.com/en/resources/blog/2020/7-things-to-know-before-selecting-welded-metal-bellows-seals-for-you application.

Delgado et al., A Review of Engine Seal Performance and Requirements for Current and Future Army Engine Platforms, NASA/TM-2008-215161, 43$^{rd}$ Joint Propulsion Conference Cosponsored by the AIAA, ASME, SAE, and ASEE, Cincinnati, Jul. 8-11, 2007, Mar. 2008, 22 Pages. https://apps.dtic.mil/sti/pdfs/AD1043317.pdf.

* cited by examiner

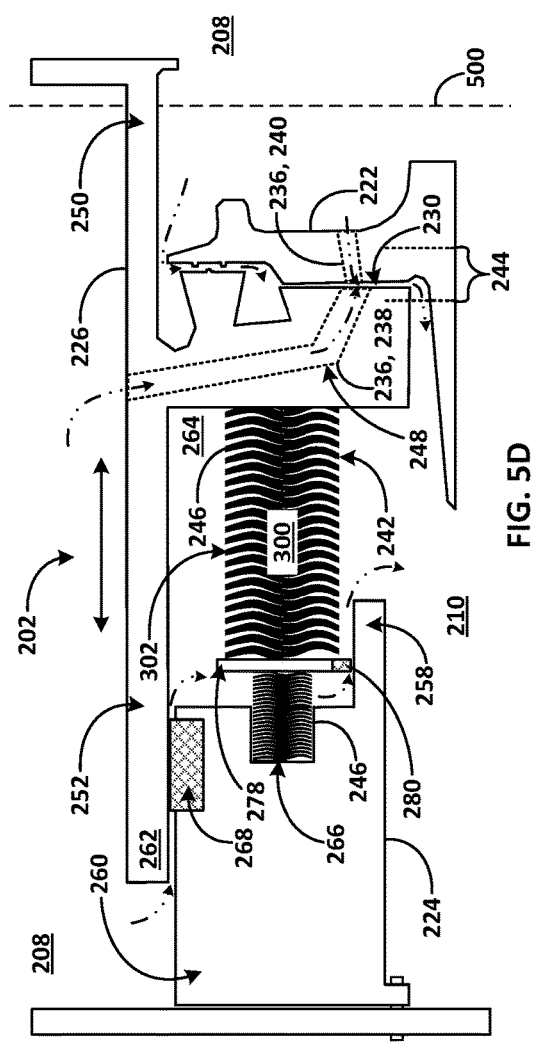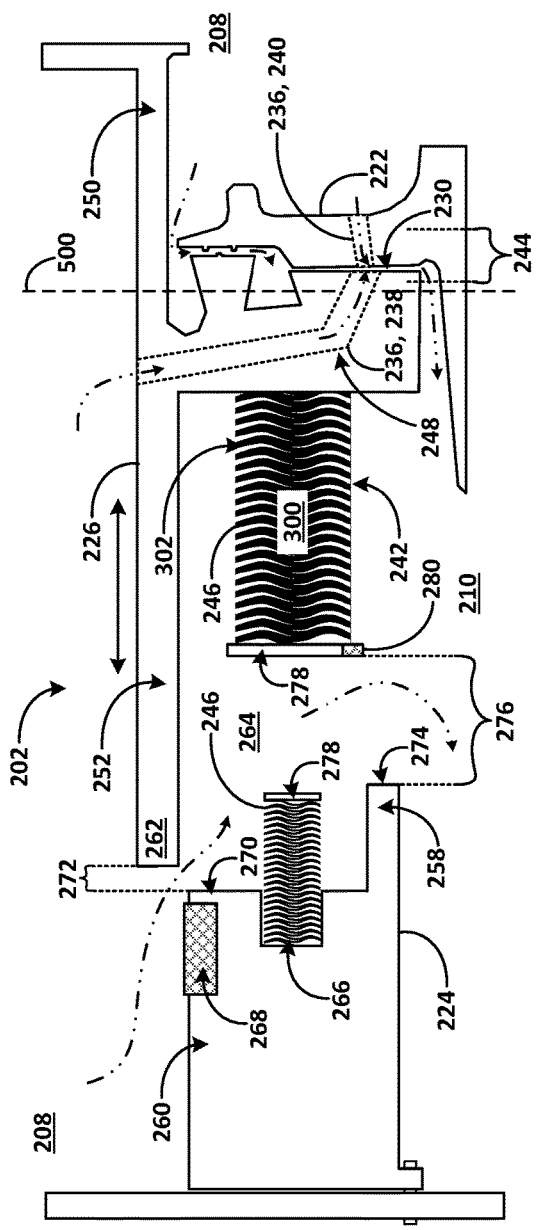

SEAL ASSEMBLIES FOR TURBINE ENGINES AND RELATED METHODS

PRIORITY INFORMATION

The present application claims priority to Indian Provisional Patent Application Number 202211011484 filed on Mar. 3, 2022.

FIELD

The present disclosure generally pertains to seal assemblies for rotary machines, and more particularly, to aspirating seals for rotary machines such as turbine engines, as well as methods of operating a rotary machine that includes a seal assembly.

BACKGROUND

Rotary machines such as gas turbine engines have seals between rotating components (e.g., rotors) and corresponding stationary components (e.g., stators). These seals may help to reduce leakage of fluids between the rotors and stators. These seals may additionally or alternatively help separate fluids that have respectively different pressures and/or temperatures. The sealing properties of a seal may impact not only the amount of leakage and/or separation of fluids, but also the overall operation and/or operating efficiency of the rotary machine. Accordingly, it would be welcomed in the art to provide improved seal assemblies for rotary machines such as turbine engines, as well as improved methods of sealing an interface between a rotor and a stator of a rotary machine.

BRIEF DESCRIPTION OF THE DRAWINGS

A full and enabling disclosure, including the best mode thereof, directed to one of ordinary skill in the art, is set forth in the specification, which makes reference to the appended Figures, in which:

FIG. 5D shows a schematic side view of the exemplary seal assembly of FIG. 5A, in a cruise position;

FIG. 5E shows a schematic side view of the exemplary seal assembly of FIG. 5A, in a relief position;

Figure 1:
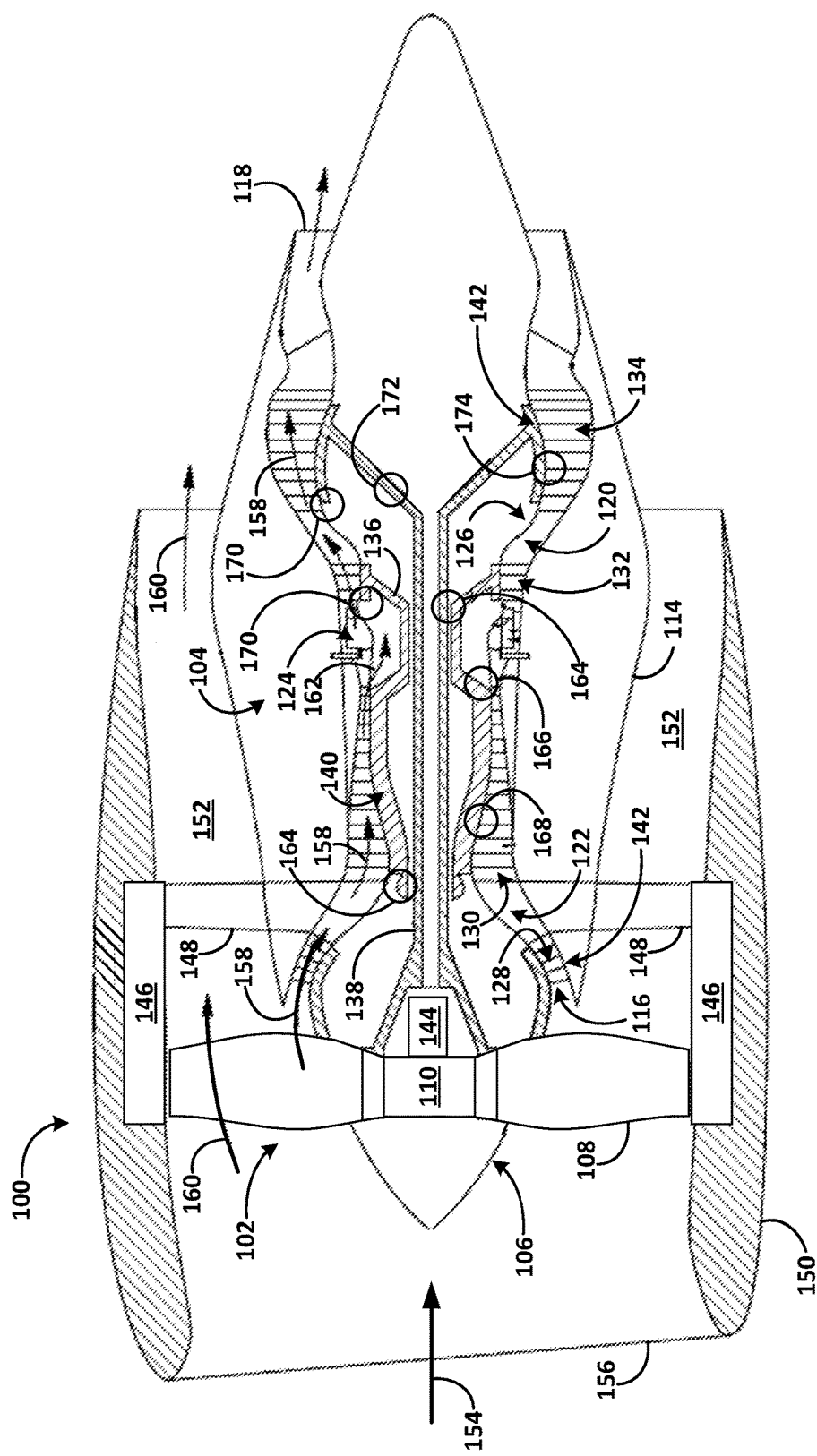
FIG. 1 shows a schematic cross-sectional view of an exemplary rotary machine that includes turbine engine.

Repeat use of reference characters in the present specification and drawings is intended to represent the same or analogous features or elements of the present disclosure.

DETAILED DESCRIPTION

Reference now will be made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first", "second", and "third" may be used interchangeably to distinguish one component from another and are not intended to signify location or importance of the individual components.

The terms "upper", "lower", "right", "left", "vertical", "horizontal", "top", "bottom", "lateral", "longitudinal", and so forth, shall relate to the disclosure as it is oriented in the drawing figures. However, it is to be understood that the disclosure may assume various alternative orientations, except where expressly specified to the contrary. It is also to be understood that the specific devices illustrated in the attached drawings, and described in the following specification, are simply exemplary embodiments of the disclosure. Hence, specific dimensions and other physical characteristics related to the embodiments disclosed herein are not to be considered as limiting.

The terms "forward" and "aft" refer to relative positions within a turbine engine, with forward referring to a position closer to an engine inlet and aft referring to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The singular forms "a", "an", and "the" include plural references unless the context clearly dictates otherwise.

The terms "coupled," "fixed," "attached to," and the like refer to both direct coupling, fixing, or attaching, as well as indirect coupling, fixing, or attaching through one or more intermediate components or features, unless otherwise specified herein.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Additionally, the terms "low," "high," or their respective comparative degrees (e.g., lower, higher, where applicable) each refer to relative speeds within an engine, unless otherwise specified. For example, a "low-pressure turbine" operates at a pressure generally lower than a "high-pressure turbine." Alternatively, unless otherwise specified, the aforementioned terms may be understood in their superlative degree. For example, a "low-pressure turbine" may refer to the lowest maximum pressure turbine within a turbine section, and a "high-pressure turbine" may refer to the highest maximum pressure turbine within the turbine section.

The term "turbomachine" or "turbomachinery" refers to a machine including one or more compressors, a heat generating section (e.g., a combustor section), and one or more turbines that together generate a torque output.

As used herein, the term "turbine engine" refers to an engine that includes a turbomachine as all or a portion of its power source. Example turbine engines include gas turbine engines, as well as hybrid-electric turbine engines, such as turbofan engines, turboprop engines, turbojet engines, turboshaft engines, and the like.

As used herein, the term "rated speed" refers to a maximum rotational speed that a rotary machine, such as a turbine engine, may achieve while operating properly. For example, a rotary machine, such as turbine engine, may be operating at the rated speed during maximum load operations, such as during takeoff operations.

As used herein, the term nominal operating conditions refers to operation of a rotary machine, such as a turbine engine, at a rotational speed that is greater than an idle speed and less than a rated speed for the rotary machine. For example, nominal operating conditions may include a rotational speed that is at least 10% greater than the idle speed and at least 10% less than the rated speed.

As used herein, the term cruise operating conditions refers to operation of a rotary machine, such as a turbine engine, at a relatively high rotational speed for a sustained period of time. For example, a rotary machine, such as a turbine engine, utilized to power an aircraft may exhibit cruise operating conditions when the aircraft levels after a claim to a specified altitude. In some embodiments, a rotary machine may exhibit cruise operating conditions at a rotational speed that is from about 50% to about 90% of the rated speed, such as from about 70% to about 80% of the rated speed.

As used herein, the term low-power operating state refers to operation of a rotary machine, such as a turbine engine, at a rotational speed that is at least less than 10% greater than an idle speed for the rotary machine.

As used herein, the term high-power operating state refers to operation of a rotary machine, such as a turbine engine, at a rotational speed that is at least 90% of a rated speed for the rotary machine.

As used herein, the term "rotor" refers to any component of a rotary machine, such as a turbine engine, that rotates about an axis of rotation. By way of example, a rotor may include a shaft or a spool of a rotary machine, such as a turbine engine.

As used herein, the term "stator" refers to any component of a rotary machine, such as a turbine engine, that has a coaxial configuration and arrangement with a rotor of the rotary machine. A stator may be stationary or may rotate about an axis of rotation. A stator may be disposed radially inward or radially outward along a radial axis in relation to at least a portion of a rotor. Additionally, or in the alternative, a stator may be disposed axially adjacent to at least a portion of a rotor.

One or more components of the turbomachine engine described herein below may be manufactured or formed using any suitable process, such as an additive manufacturing process, such as a 3-D printing process. The use of such a process may allow such component to be formed integrally, as a single monolithic component, or as any suitable number of sub-components. In particular, the additive manufacturing process may allow such component to be integrally formed and include a variety of features not possible when using prior manufacturing methods. For example, the additive manufacturing methods described herein may allow for the manufacture of passages, conduits, cavities, openings, casings, manifolds, double-walls, heat exchangers, or other components, or particular positionings and integrations of such components, having unique features, configurations, thicknesses, materials, densities, fluid passageways, headers, and mounting structures that may not have been possible or practical using prior manufacturing methods. Some of these features are described herein.

Suitable additive manufacturing technologies in accordance with the present disclosure include, for example, Selective Laser Melting (SLM), Direct Metal Laser Melting (DMLM), Fused Deposition Modeling (FDM), Selective Laser Sintering (SLS), 3D printing such as by inkjets, laser jets, and binder jets, Stereolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), and other known processes.

Suitable powder materials for the manufacture of the structures provided herein as integral, unitary, structures include metallic alloy, polymer, or ceramic powders. Exemplary metallic powder materials are stainless-steel alloys, cobalt-chrome alloys, aluminum alloys, titanium alloys, nickel-based superalloys, and cobalt-based superalloys. In addition, suitable alloys may include those that have been engineered to have good oxidation resistance, known as "superalloys" which have acceptable strength at the elevated temperatures of operation in a turbine engine, e.g. Hastelloy, Inconel alloys (e.g., IN 738, IN 792, IN 939), Rene alloys (e.g., Rene N4, Rene N5, Rene 80, Rene 142, Rene 195), Haynes alloys, Mar M, CM 247, CM 247 LC, C263, 718, X-850, ECY 768, 282, X45, PWA 1483 and CMSX (e.g. CMSX-4) single crystal alloys. The manufactured objects of the present disclosure may be formed with one or more selected crystalline microstructures, such as directionally solidified ("DS") or single-crystal ("SX").

As used herein, the terms "integral", "unitary", or "monolithic" as used to describe a structure refers to the structure being formed integrally of a continuous material or group of materials with no seams, connections joints, or the like. The integral, unitary structures described herein may be formed through additive manufacturing to have the described structure, or alternatively through a casting process, etc.

The present disclosure generally provides seal assemblies for rotary machines. The presently disclosed seal assemblies may be utilized in any rotary machine. Exemplary embodiments may be particularly suitable for turbomachines, such as turbine engines, and the like. The presently disclosed seal assemblies include aspirating seals that provide a thin film of fluid between a face of the seal and a face of the rotor. The thin film of fluid may be provided by a one or more aspiration conduits that allow fluid, such as pressurized air or gasses within a turbine engine to flow from a higher-pressure region on one side of the seal assembly to a lower-pressure region on another side of the seal assembly. The fluid flowing through the aspiration conduits provides a thin film of pressurized fluid between the seal face and the rotor face. The thin film of pressurized fluid may act as a fluid bearing, such as a gas bearing, that inhibits contact between the seal and the rotor. For example, the fluid bearing may be a hydrostatic bearing, an aerostatic bearing, or the like.

The presently disclosed seal assemblies are generally considered non-contacting seals, in that the fluid bearing inhibits contact between the seal face and the rotor face. The presently disclosed seal assemblies include a primary seal defined by a rotor face of a seal rotor and a slider face of a seal slider. The primary seal may be configured as an aspirating face seal, a fluid bearing, a gas bearing, or the like. The seal slider may be slidably coupled to a seal stator, allowing the seal slider to slidably engage and retract the slider face with respect to the rotor face. The presently disclosed seal assemblies additionally include a secondary seal disposed between the seal slider and the seal stator. The secondary seal may compress and rebound and/or expand and rebound, over at least a portion of a range of motion of the seal slider. The secondary seal may be impermeable to fluid and/or may provide a fluid-tight seal between the seal slider and the seal stator. In some embodiments, the secondary seal may include a bellow seal and/or a finger seal.

In some embodiments, the presently disclosed seal assemblies may advantageously provide smooth movement of the seal slider, allowing responsive movement with changes in operating conditions. Additionally, the presently disclosed seal assemblies may provide improved responsiveness to motive forces caused by transient operating conditions of the rotary machine and/or aberrant movement of the rotor. The seal assemblies include features described herein that provide for improved movement of the seal slider, improved positioning of the seal face relative to the rotor face, enhanced range of motion of the seal slider, and/or improved responsiveness to transient operating conditions and/or aberrant movement of the rotor. The presently disclosed seal assemblies may accommodate a wider range of operating conditions and/or may provide improved operating performance, including improved performance of the seal assembly and/or improved performance of the rotary machine. Additionally, or in the alternative, the presently disclosed seal assemblies may provide for a lower likelihood of contact between the seal face and the rotor face during transient conditions, enhancing the durability and/or useful life of the seal assembly, rotor, and/or related components of the rotary machine.

Exemplary embodiments of the present disclosure will now be described in further detail. Referring to FIG. 1, an exemplary turbine engine 100 will be described. In some embodiments, the presently disclosed seal assemblies may be included in a rotary machine such as the turbine engine 100. The exemplary turbine engine 100 may be mounted to an aircraft, such as in an under-wing configuration or tail-mounted configuration. It will be appreciated that the turbine engine 100 shown in FIG. 1 is provided by way of example and not to be limiting, and that the subject matter of the present disclosure may be implemented with other types of turbine engines, as well as other types of rotary machines.

In general, the turbine engine 100 may include a fan section 102 and a core engine 104 disposed downstream from the fan section 102. The fan section 102 may include a fan 106 with any suitable configuration, such as a variable pitch, single stage configuration. The fan 106 may include a plurality of fan blades 108 coupled to a fan disk 110 in a spaced apart manner. The fan blades 108 may extend outwardly from the fan disk 110 generally along a radial direction. The core engine 104 may be coupled directly or indirectly to the fan section 102 to provide torque for driving the fan section 102.

The core engine 104 may include an engine case 114 that encases one or more portions of the core engine 104, including, a compressor section 122, a combustor section 124, and a turbine section 126. The engine case 114 may define a core engine-inlet 116, an exhaust nozzle 118, and a core air flowpath 120 therebetween. The core air flowpath 120 may pass through the compressor section 122, the combustor section 124, and the turbine section 126, in serial flow relationship. The compressor section 122 may include a first, booster or low pressure (LP) compressor 128 and a second, high pressure (HP) compressor 130. The turbine section 126 may include a first, high pressure (HP) turbine 132 and a second, low pressure (LP) turbine 134. The compressor section 122, combustor section 124, turbine section 126, and exhaust nozzle 118 may be arranged in serial flow relationship and may respectively define a portion of the core air flowpath 120 through the core engine 104.

The core engine 104 and the fan section 102 may be coupled to a shaft driven by the core engine 104. By way of example, as shown in FIG. 1, the core engine 104 may include a high pressure (HP) shaft 136 and a low pressure (LP) shaft 138. The HP shaft 136 may drivingly connect the HP turbine 132 to the HP compressor 130. The LP shaft 138 may drivingly connect the LP turbine 134 to the LP compressor 128. In other embodiments, a turbine engine may have three shafts, such as in the case of a turbine engine that includes an intermediate pressure turbine. A shaft of the core engine 104, together with a rotating portion of the core engine 104, may sometimes be referred to as a "spool." The HP shaft 136, a rotating portion of the HP compressor 130 coupled to the HP shaft 136, and a rotating portion of the HP turbine 132 coupled to the HP shaft 136, may be collectively referred to as a high pressure (HP) spool 140. The LP shaft 138, a rotating portion of the LP compressor 128 coupled to the LP shaft 138, and a rotating portion of the LP turbine 134 coupled to the LP shaft 138, may be collectively referred to as low pressure (LP) spool 142.

In some embodiments, the fan section 102 may be coupled directly to a shaft of the core engine 104, such as directly to an LP shaft 138. Alternatively, as shown in FIG. 1, the fan section 102 and the core engine 104 may be coupled to one another by way of a power gearbox 144, such as a planetary reduction gearbox, an epicyclical gearbox, or the like. For example, the power gearbox 144 may couple the LP shaft 138 to the fan 106, such as to the fan disk 110 of the fan section 102. The power gearbox 144 may include a plurality of gears for stepping down the rotational speed of the LP shaft 138 to a more efficient rotational speed for the fan section 102.

Still referring to FIG. 1, the fan section 102 of the turbine engine 100 may include a fan case 146 that at least partially surrounds the fan 106 and/or the plurality of fan blades 108. The fan case 146 may be supported by the core engine 104, for example, by a plurality of outlet guide vanes 148 circumferentially spaced and extending substantially radially therebetween. The turbine engine 100 may include a nacelle 150. The nacelle 150 may be secured to the fan case 146. The nacelle 150 may include one or more sections that at least partially surround the fan section 102, the fan case 146, and/or the core engine 104. For example, the nacelle 150 may include a nose cowl, a fan cowl, an engine cowl, a thrust reverser, and so forth. The fan case 146 and/or an inward portion of the nacelle 150 may circumferentially surround an outer portion of the core engine 104. The fan case 146 and/or the inward portion of the nacelle 150 may define a bypass passage 152. The bypass passage 152 may be disposed annularly between an outer portion of the core engine 104 and the fan case 146 and/or inward portion of the nacelle 150 surrounding the outer portion of the core engine 104.

During operation of the turbine engine 100, an inlet airflow 154 enters the turbine engine 100 through an inlet 156 defined by the nacelle 150, such as a nose cowl of the nacelle 150. The inlet airflow 154 passes across the fan blades 108. The inlet airflow 154 splits into a core airflow 158 that flows into and through the core air flowpath 120 of the core engine 104 and a bypass airflow 160 that flows through the bypass passage 152. The core airflow 158 is compressed by the compressor section 122. Pressurized air from the compressor section 122 flows downstream to the combustor section 124 where fuel is introduced to generate combustion gasses, as represented by arrow 162. The combustion gasses exit the combustor section 124 and flow through the turbine section 126, generating torque that rotates the compressor section 122 to support combustion while also rotating the fan section 102. Rotation of the fan section 102 causes the bypass airflow 160 to flow through the bypass passage 152, generating propulsive thrust. Additional thrust is generated by the core airflow 158 exiting the exhaust nozzle 118.

In some exemplary embodiments, the turbine engine 100 may be a relatively large power class turbine engine 100 that may generate a relatively large amount of thrust when operated at the rated speed. For example, the turbine engine 100 may be configured to generate from about 300 Kilonewtons (kN) of thrust to about 700 kN of thrust, such as from about 300 kN to about 500 kN of thrust, such as from about 500 kN to about 600 kN of thrust, or such as from about 600 kN to about 700 kN of thrust. However, it will be appreciated that the various features and attributes of the turbine engine 100 described with reference to FIG. 1 are provided by way of example only and not to be limiting. In fact, the present disclosure may be implemented with respect to any desired turbine engine, including those with attributes or features that differ in one or more respects from the turbine engine 100 described herein.

Still referring to FIG. 1, the turbine engine 100 includes seal assemblies at a number of locations throughout the turbine engine 100, any one or more of which may be configured according to the present disclosure. A presently disclosed seal assembly may be provided in a turbine engine 100 at any location that includes an interface with a rotating portion of the turbine engine 100, such as an interface with a rotating portion or spool of the core engine 104. For example, a seal assembly may be included at an interface with a portion of the LP spool 142 and/or at an interface with the HP spool 140. In some embodiments, a seal assembly may be included at an interface between a spool, such as the LP spool 142 or the HP spool 140, a stationary portion of the core engine 104. Additionally, or in the alternative, a seal assembly may be included at an interface between the LP spool 142 and the HP spool 140. Additionally, or in the alternative, a seal assembly may be included at an interface between a stationary portion of the core engine 104 and the LP shaft 138 or the HP shaft 136, and/or at an interface between the LP shaft 138 and the HP shaft 136.

By way of example, FIG. 1 shows some exemplary locations of a seal assembly. As one example, a seal assembly may be located at or near a bearing compartment 164. A seal assembly located at or near the bearing compartment 164 may sometimes be referred to as a bearing compartment seal. Such a bearing compartment seal may be configured to inhibit air flow, such as core airflow 158 from passing into a bearing compartment of the turbine engine 100, such as a bearing compartment located at an interface between the LP shaft 138 and the HP shaft 136. As another example, a seal assembly may be located at or near the compressor section 122 of the turbine engine 100. In some embodiments, a seal assembly may be located at or near a compressor discharge 166, for example, of the HP compressor 130. A seal assembly located at or near the compressor discharge 166 may sometimes be referred to as a compressor discharge pressure seal. Such a compressor discharge pressure seal may be configured to maintain pressure downstream of the compressor section 122 and/or to provide bearing thrust balance. Additionally, or in the alternative, a seal assembly may be located between adjacent compressor stages 168 of the compressor section 122. A seal assembly located between adjacent compressor stages 168 may be sometimes referred to as a compressor interstage seal. Such a compressor interstage seal may be configured to limit air recirculation within the compressor section 122. As another example, a seal assembly may be located at or near the turbine section 126 of the turbine engine 100. In some embodiments, a seal assembly may be located at or near a turbine inlet 170, for example, of the HP turbine 132 or the LP turbine 134. A seal assembly located at or near a turbine inlet 170 may sometimes be referred to as a forward turbine seal. Such a forward turbine seal may be configured to contain high-pressure cooling air for the HP turbine 132 and/or the LP turbine 134, such as for turbine disks and turbine blades thereof. Additionally, or in the alternative, a seal assembly may be located at or near one or more turbine disk rims 172. A seal assembly located at or near a turbine disk rim 172 may sometimes be referred to as a turbine disk rim seal. Such a turbine disk rim seal may be configured to inhibit hot gas ingestion into the disk rim area. Additionally, or in the alternative, a seal assembly may be located between adjacent turbine stages 174 of the turbine section 126. A seal assembly located between adjacent turbine stages 174 may be sometimes referred to as a turbine interstage seal. Such a turbine interstage seal may be configured to limit air recirculation within the turbine section 126.

A seal assembly at any one or more of these locations or other location of a turbine engine 100 may be configured in accordance with the present disclosure. Additionally, or in the alternative, the turbine engine 100 may include a presently disclosed seal assembly at one or more other locations of the turbine engine 100. It will also be appreciated that the presently disclosed seal assemblies may also be used in other rotary machines, and that the turbine engine 100 described with reference to FIG. 1 is provided by way of example and not to be limiting.

Figure 2A:
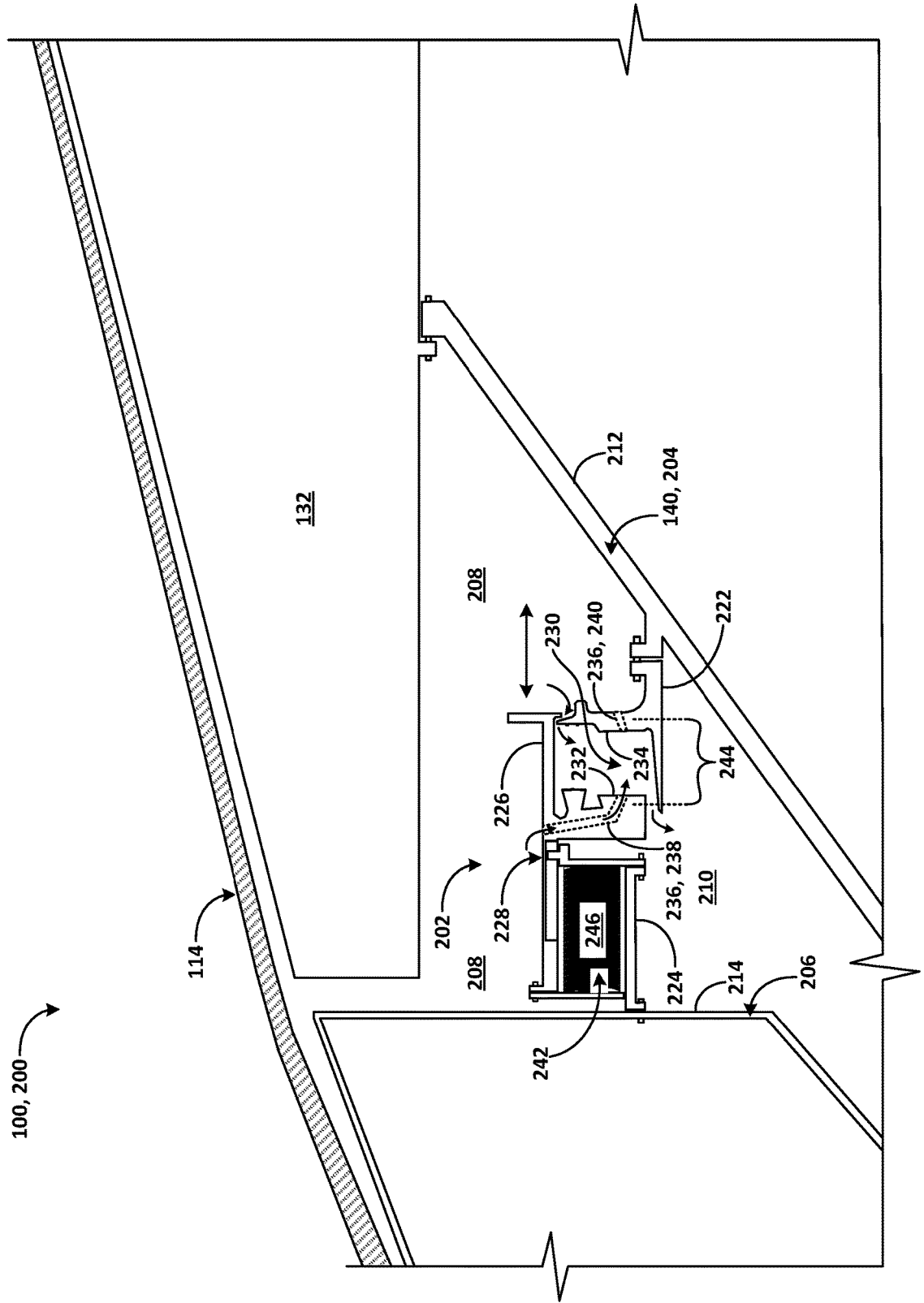
FIGS. 2A and 2B respectively show schematic perspective views of an exemplary seal assembly disposed adjacent to a rotor a turbine engine.
Figure 2B:
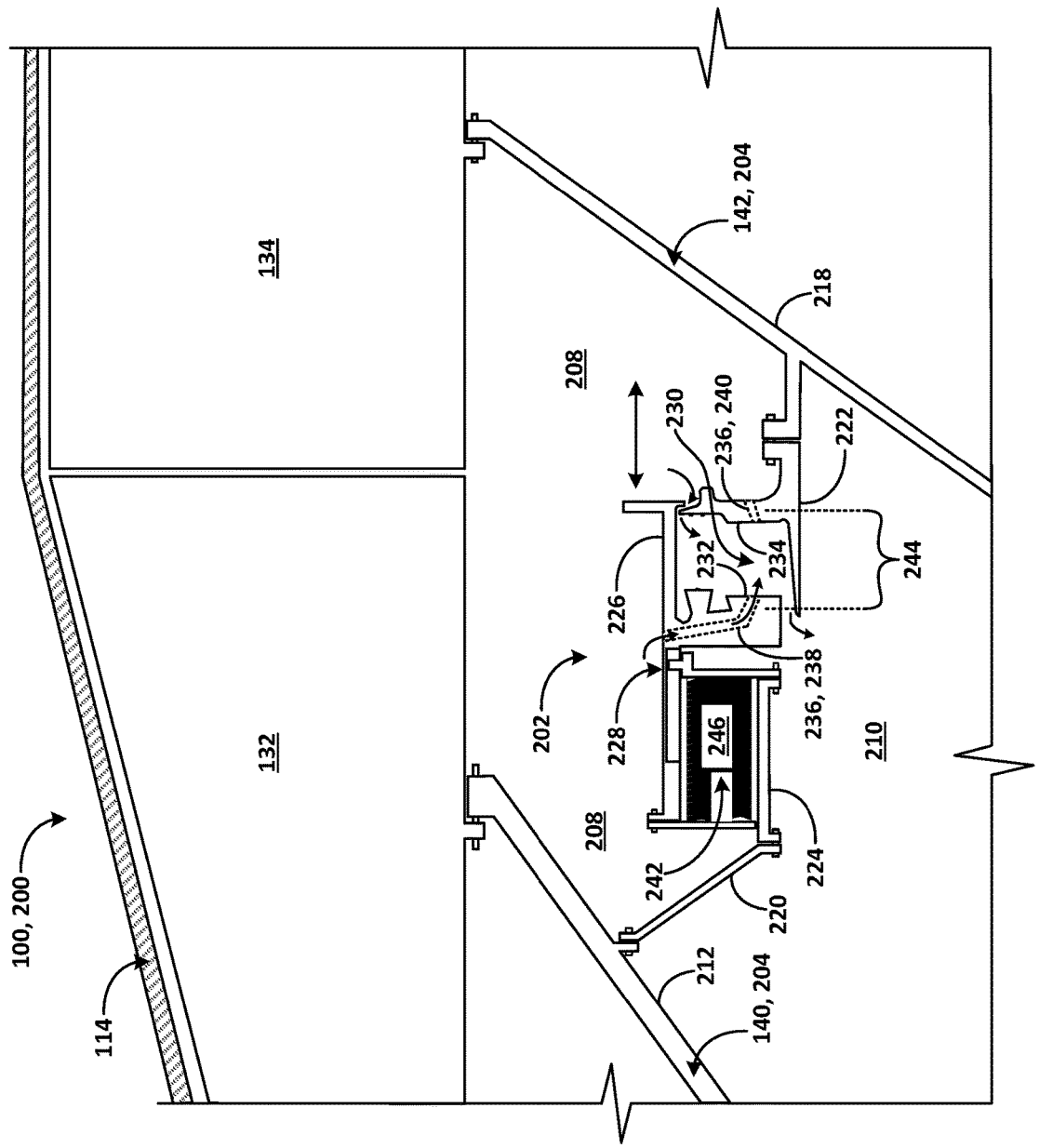

Now referring to FIGS. 2A and 2B, exemplary seal assemblies are further described. As shown in FIGS. 2A and 2B, a rotary machine 200, such as a turbine engine 100, may include a seal assembly 202 configured to provide a seal interface with a rotor 204, such as between a rotor 204 and a stator 206 of a rotary machine 200. The seal assembly 202 may be integrated into any rotary machine 200, such as a turbine engine 100 as described with reference to FIG. 1. As shown in FIGS. 2A and 2B, the seal assembly 202 may separate an inlet plenum 208 from an outlet plenum 210. The inlet plenum 208 may define a region of the rotary machine 200 that includes a relatively higher-pressure fluid volume. The outlet plenum 210 may define a region of the rotary machine 200 that includes a relatively lower-pressure fluid volume. The seal assembly 202 may have an annular configuration. In some embodiments, the seal assembly 202 may include a plurality of annular elements that may be assembled to provide the seal assembly 202. Additionally, or in the alternative, the seal assembly 202 may include a plurality of semi-annular elements that may be assembled to provide the seal assembly 202 that has an annular configuration.

In some embodiments, as shown, for example, in FIG. 2A, a seal assembly 202 may provide a seal interface between an HP spool 140 and a stationary portion of the core engine 104. For example, the rotor 204 may include a portion of an HP spool 140. Additionally, or in the alternative, the rotor 204 may include an HP spool cone 212 that defines a portion of the HP spool 140. In some embodiments, the stator 206 may include a turbine center frame 214. The seal assembly 202 may provide a seal interface between the HP spool cone 212 and the turbine center frame 214. Additionally, or in the alternative, in some embodiments, as shown, for example, in FIG. 2B, a seal assembly 202 may provide a seal interface between rotating bodies, such as between an HP spool 140 and the LP spool 142. The rotor 204 may include a portion of an LP spool 142. For example, the rotor 204 may include an LP spool cone 218 that defines a portion of the LP spool 142. Additionally, or in the alternative, the seal assembly 202 may be coupled to the HP spool cone 212. For example, the seal stator 224 may be coupled to the HP spool 140, such as to the HP spool cone 212. The seal rotor 222 may be coupled to the LP spool 142, such as to the LP spool cone 218. The seal assembly 202 may define a seal interface between the HP spool cone 212 and the LP spool cone 218.

In some embodiments, an inner extension 220 may couple the seal assembly 202 to the HP spool cone 212.

The seal assembly 202 may be configured as an aspirating seal that provides a non-contacting seal interface that inhibits contact between the seal stator 224 and a seal slider 226. By way of example, the seal assembly 202 may include or may be configured as an aspirating face seal, a fluid bearing, a gas bearing, or the like. During operation, a fluid within the inlet plenum 208 may flow, e.g., aspirate, through one or more pathways of the seal assembly 202 to the outlet plenum 210. The fluid flow may provide for the non-contacting seal interface. In some embodiments, the fluid may include pressurized air, gasses, and/or vapor. In other embodiments, the fluid may include a liquid.

As shown, a seal assembly 202 may be disposed adjacent to a rotor 204. The seal assembly 202 may include a seal rotor 222, a seal stator 224, and a seal slider 226. The seal rotor 222 may be coupled to a rotor 204, such as to an HP spool cone 212 or another portion of an HP spool 140, or such as to an LP spool cone 218 or other portion of an LP spool 142. In some embodiments, the seal stator 224 may be coupled to a stationary portion of the core engine 104, such as to a turbine center frame 214. In some embodiments, the seal stator 224 may be coupled to a rotating portion of the core engine 104, such as to the HP spool cone 212 or other portion of an HP spool 140, or such as to an LP spool cone 218 or other portion of an LP spool 142. Additionally, or in the alternative, the seal stator 224 may be coupled to an inner extension 220, as shown, for example, in FIG. 2B. The seal slider 226 may be slidably coupled to the seal stator 224 at a slide interface 228. The seal rotor 222, the seal stator 224, and/or the seal slider 226 may respectively have an annular configuration. Additionally, or in the alternative, the seal rotor 222, the seal stator 224, and/or the seal slider 226 may respectively include a plurality of semi-annular elements that may be assembled to provide an annular assembly. The seal assembly 202 may include a primary seal 230. The primary seal 230 may include or may be configured as an aspirating face seal, a fluid bearing, a gas bearing, or the like. The primary seal 230 may have an annular configuration defined by one or more annular or semi-annular components, such as the seal slider 226 and/or the seal rotor 222.

The seal slider 226 may include a slider face 232. The seal rotor 222 may include a rotor face 234. The primary seal 230 may be defined at least in part by the slider face 232 of the seal slider 226 and the rotor face 234 of the seal rotor 222. The slider face 232 and the rotor face 234 may provide a non-contacting interface that defines the aspirating face seal, fluid bearing, gas bearing, or the like, of the primary seal 230. The seal slider 226 may be configured to slidably engage and retract the slider face 232 with respect to the rotor face 234. In some embodiments, the seal assembly 202 may include a plurality of aspiration conduits 236 configured to supply fluid from the inlet plenum 208 to the primary seal 230. The plurality of aspiration conduits 236 may be defined by a monolithic structure of one or more components of the seal assembly 202.

In some embodiments, the seal slider 226 may include a plurality of aspiration conduits 236 configured to supply fluid from the inlet plenum 208 to the primary seal 230. The aspiration conduits 236 defined by the seal slider 226 may sometimes be referred to as slider-aspiration conduits 238. The slider-aspiration conduits 238 may define an internal conduit, pathway, or the like that passes through the seal slider 226. The slider-aspiration conduits 238 may fluidly communicate with the inlet plenum 208 and the primary seal 230. The slider-aspiration conduits 238 may discharge fluid from the inlet plenum 208 to the primary seal 230, for example, at a plurality of openings in the slider face 232.

Additionally, or in the alternative, in some embodiments, the seal rotor 222 may include a plurality of aspiration conduits 236 configured to supply fluid from the inlet plenum 208 to the primary seal 230. The plurality of aspiration conduits 236 may be defined by a monolithic structure of the seal rotor 222. The aspiration conduits 236 defined by the seal rotor 222 may sometimes be referred to as rotor-aspiration conduits 240. The rotor-aspiration conduits 240 may define an internal conduit, pathway, or the like that passes through the seal rotor 222. The rotor-aspiration conduits 240 may fluidly communicate with the inlet plenum 208 and the primary seal 230. The rotor-aspiration conduits 240 may discharge fluid from the inlet plenum 208 to the primary seal 230, for example, at a plurality of openings in the rotor face 234.

During operation, the seal slider 226 may slide forward and aft relative to the seal stator 224 and the seal rotor 222. Movement of the seal slider 226 may be initiated at least in part due to a pressure difference between the inlet plenum 208 and the outlet plenum 210. By way of example, FIGS. 2A and 2B show the seal slider 226 in a retracted position such that the primary seal 230 is relatively open. The seal slider 226 may occupy a retracted position, for example, when the rotary machine 200 operates at idle. As the power output and/or rotational speed increases, the seal slider 226 may slide forward towards the seal rotor 222, for example, as the pressure differential increases between the inlet plenum 208 and the outlet plenum 210. The seal slider 226 may occupy an engaged position, for example, when the rotary machine 200 operates at nominal operating conditions and/or at rated operating conditions. With the seal slider 226 in an engaged position, the slider face 232 and the rotor face 234 come into close proximity, while fluid flow from the inlet plenum 208 to the outlet plenum 210, such as through the plurality of aspiration conduits 236 may define an aspirating face seal, a fluid bearing, a gas bearing, or the like, that provides a non-contacting interface between the slider face 232 and the rotor face 234.

The seal assembly 202 may include a secondary seal 242. The secondary seal 242 may have an annular configuration defined by one or more annular or semi-annular components. The secondary seal 242 may exhibit elasticity while compressing and rebounding, and/or while expanding and rebounding, over at least a portion of a range of motion of the seal slider 226. The secondary seal 242 may inhibit or prevent fluid from passing therethrough, such as from the inlet plenum 208 to the outlet plenum 210, for example, while allowing the seal slider 226 to slide forward and aft relative to the seal stator 224 and the seal rotor 222, such as between a retracted position and an engaged position, in accordance with operating conditions of the rotary machine 200.

In some embodiments, the secondary seal 242 may be configured to provide resistance to a compression load. At least a portion of the compression load upon the secondary seal 242 may be activated when the seal slider 226 moves forward towards the seal rotor 222. Additionally, or in the alternative, the secondary seal 242 may exhibit at least some preload, such as at least some compression preload. The secondary seal 242 may be configured to exhibit a force constant, such as under a compression load, configured at least in part to provide resistance to the compression load while exhibiting forward and/or aft displacement suitable for operation of the primary seal 230, such as under specified operating conditions of the rotary machine 200. In some embodiments, in addition or in the alternative to a compression load, the secondary seal 242 may be configured to provide resistance to a tension load. At least a portion of the tension load upon the secondary seal 242 may be activated when the seal slider 226 moves forward towards the seal rotor 222. Additionally, or in the alternative, the secondary seal 242 may exhibit at least some preload, such as at least some tension preload. The secondary seal 242 may be configured to exhibit a force constant, such as under a tension load, configured at least in part to provide resistance to the tension load while exhibiting forward and/or aft displacement suitable for operation of the primary seal 230, such as under specified operating conditions of the rotary machine 200. The forward and aft displacement of the secondary seal 242 may include compression and/or expansion of one or more secondary sealing elements 246 of the secondary seal 242. The specified operating conditions of the rotary machine 200 may include, for example, at least one of: startup operating conditions, idle operating conditions, shutdown operating conditions, nominal operating conditions, transient operating conditions, and aberrant operating conditions. A force vector, such as a compression force vector, acting on the secondary seal 242 may impart a compression load sufficient to move the seal slider 226 towards the seal rotor 222 and/or to hold the seal slider 226 in a position, such as an engaged position, relative to the seal rotor 222. Additionally, or in the alternative, a force vector, such as a tension force vector, acting on the secondary seal 242 may impart a tension load sufficient to move the seal slider 226 towards the seal rotor 222 and/or to hold the seal slider 226 in a position, such as an engaged position, relative to the seal rotor 222. The force vector may include at least a pressure difference between the inlet plenum 208 and the outlet plenum 210. The force vector acting on the secondary seal 242 may cause the seal slider 226 to occupy and/or maintain an engaged position relative to the seal rotor 222 such that the slider face 232 has a suitable distance from the rotor face 234 to provide an aspirating face seal, a fluid bearing, a gas bearing, or the like.

In some embodiments, resistance to a compression load provided by the secondary seal 242 may retract the seal slider 226 away from the seal rotor 222 and/or hold the seal slider 226 in a retracted position relative to the seal rotor 222. The secondary seal 242 may exhibit a rebound force sufficient to overcome the compression load, retracting the seal slider 226 and/or holding the seal slider 226 in a retracted position. Additionally, or in the alternative, resistance to a tension load provided by the secondary seal 242 may retract the seal slider 226 away from the seal rotor 222 and/or hold the seal slider 226 in a retracted position relative to the seal rotor 222. The secondary seal 242 may exhibit a rebound force sufficient to overcome the tension load, retracting the seal slider 226 and/or holding the seal slider 226 in a retracted position. The force constant of the secondary seal 242 may overcome the compression force vector and/or the tension force vector acting upon the secondary seal 242, causing the seal slider 226 to occupy and/or maintain a retracted position relative to the seal rotor 222, for example, when the pressure difference between the inlet plenum 208 and the outlet plenum is below, or decreases below, a threshold value. The secondary seal 242 may retract and/or hold the seal slider 226 in a retracted position relative to the seal rotor 222 under specified operating conditions of the rotary machine 200, including, for example, at least one of: startup operating conditions, idle operating conditions, shutdown operating conditions, transient operating conditions, and aberrant operating conditions. In some embodiments, with the seal slider 226 occupying a retracted position relative to the seal rotor 222, the slider face 232 of the primary seal 230 may be sufficiently separated from the rotor face 234 of the seal rotor 222 to provide disengage the aspirating face seal, fluid bearing, gas bearing, or the like.

In some embodiments, the seal rotor 222 may move forward and aft relative to the seal slider 226 and/or the seal stator 224. The seal slider 226 may be configured to move forward and aft responsive to movement of the seal rotor 222. For example, forward and aft movements of the seal slider 226 may track forward and aft movements of the seal rotor 222. In some embodiments, a force vector acting upon the secondary seal 242 may include at least a force imparted by the seal rotor 222. Additionally, or in the alternative, the seal stator 224 may move forward and aft relative to the seal slider 226 and/or the seal rotor 222. The seal slider 226 may be configured to move forward and aft responsive to movement of the seal stator 224. For example, forward and aft movements of the seal slider 226 may track forward and aft movements of the seal stator 224. In some embodiments, a force vector acting upon the secondary seal 242 may include at least a force imparted by the seal stator 224.

During operation, the secondary seal 242 may move through various stages of compression and rebound, and/or tension and rebound, for example, responsive to variations in one or more force vectors acting upon the secondary seal 242. The variations in the one or more force vectors may include at least one of: variations in a pressure difference between the inlet plenum 208 and the outlet plenum 210, movements of the seal rotor 222, and movements of the seal stator 224. The secondary seal 242 may exhibit responsiveness to such variations in the one or more force vectors sufficient to maintain the seal slider 226 in an engaged position during specified operating conditions such that the slider face 232 may maintain a suitable distance from the rotor face 234 to provide an aspirating face seal, a fluid bearing, a gas bearing, or the like. For example, the secondary seal 242 may maintain the seal slider 226 in an engaged position during variable operating conditions that fall within a working range of variation. Additionally, or in the alternative, the secondary seal 242 may retract the seal slider to a retracted position, and/or may maintain the seal slider 226 in a retracted position, during operating conditions that fall outside of the working range of variation. Operating conditions may be within the working range of variation during at least one of: startup operating conditions, idle operating conditions, shutdown operating conditions, transient operating conditions, and aberrant operating conditions. Operating conditions may fall outside of the working range of variation during at least one of: startup operating conditions, idle operating conditions, shutdown operating conditions, transient operating conditions, and aberrant operating conditions.

Exemplary seal assemblies 202 may include a primary seal 230 that has one or more primary sealing elements 244. Additionally, or in the alternative, exemplary seal assemblies 202 may include a secondary seal 242 that has one or more secondary sealing elements 246. The one or more secondary sealing elements 246 may be coupled to the seal stator 224 and/or to the seal slider 226. In some embodiments, a rotor-facing portion of a secondary sealing element 246 may be coupled to the seal stator 224. Additionally, or in the alternative, a stator-facing portion of a secondary sealing element 246 may be coupled to the seal slider 226. In some embodiments, a stator-facing portion of a secondary sealing element 246 may be coupled to the seal stator 224. Additionally, or in the alternative, a rotor-facing portion of a secondary sealing element 246 may be coupled to the seal slider 226. The one or more primary sealing elements 244 and/or the one or more secondary sealing elements 246 may be engaged and/or disengaged depending at least in part on a position of the seal slider 226 relative to the seal rotor 222 and/or the seal stator 224. During operation, engagement and/or disengagement of the one or more primary sealing elements 244 and/or the one or more secondary sealing elements 246 may depend at least in part on one or more forces acting upon the secondary seal 242. Additionally, or in the alternative, in some embodiments, exemplary seal assemblies 202 may include a tertiary seal that has one or more tertiary sealing elements. The one or more tertiary sealing elements may be engaged and/or disengaged depending at least in part on a position of the seal slider 226 relative to the seal rotor 222 and/or the seal stator 224, for example, responsive to on one or more forces acting upon the secondary seal 242.

Referring now to FIGS. 3A-3D, 4A-4D, 5A-5E, and 6A-6F, exemplary seal assemblies 202 are further described. Exemplary seal assemblies may include a seal slider 226 as described herein. An exemplary seal slider 226 may include a primary seal body 248. The primary seal body 248 may include one or more slider faces 232. The one or more slider faces 232 may respectively interface with a corresponding one or more rotor faces 234, define a primary seal 230 and/or a corresponding one or more primary sealing elements 244. In some embodiments, the primary seal body 248 may define a plurality of slider-aspiration conduits 238. The seal slider 226 may include a rotor-facing extension 250 that projects axially towards the seal rotor 222. The rotor-facing extension may axially overlap at last a portion of the seal rotor 222 over at least a portion of the range of motion of the seal slider 226. The rotor-facing extension 250 and the primary seal body 248 may define respective portions of a single component, such as a monolithic component, or the rotor-facing extension 250 and the primary seal body 248 may be coupled to one another. The seal slider 226 may include a stator-facing extension 252 that projects axially towards the seal stator 224. The stator-facing extension 252 may axially overlap the seal stator 224 over at least a portion of the range of motion of the seal slider 226. The stator-facing extension 252 and the primary seal body 248 may define respective portions of a single component, such as a monolithic component, or the stator-facing extension 252 and the primary seal body 248 may be coupled to one another. In some embodiments, the seal stator 224 may be coupled to the seal slider 226 directly or indirectly at the stator-facing extension 252. Additionally, or in the alternative, the seal stator 224 may be coupled to the seal slider 226 directly or indirectly at the primary seal body 248. In some embodiments, the secondary seal 242 may be directly or indirectly coupled to the seal slider 226. For example, the secondary seal 242 may be coupled to the seal slider 226 directly or indirectly at the stator-facing extension 252 and/or directly or indirectly at the primary seal body 248. Additionally, or in the alternative, in some embodiments, the secondary seal 242 may be directly or indirectly coupled to the seal stator 224.

As shown, for example, in FIGS. 3A-3D and FIGS. 4A-4D, a seal assembly 202 may include at least one slider pin 254 configured to engage with a corresponding at least one slider groove 256. In some embodiments, a seal assembly 202 may include a plurality of slider pins 254 and a corresponding plurality of slider grooves 256 circumferentially spaced about the seal assembly 202. In some embodiments, one or more slider pins 254 may define a portion of the seal stator 224, and/or one or more slider pins 254 may be fixed or coupled to the seal stator 224. A corresponding one or more slider grooves 256 may extend radially through at least a portion of the seal slider 226. Additionally, or in the alternative, one or more slider pins 254 may define a portion of the seal slider 226 and/or one or more slider pins 254 may be fixed or coupled to the seal slider 226, and a corresponding one or more slider grooves 256 may extend radially through at least a portion of the seal stator 224. The one or more slider pins 254 may respectively project into a corresponding one of the one or more slider groves 256. The one or more slider pins 254 may slidably interface with the corresponding one or more slider grooves 256 as the seal slider 226 moves forwards and aft relative to the seal stator 224, and/or as the seal stator 224 moves forward and aft relative to the seal slider 226. The one or more slider pins 254 may interface with a corresponding one or more slider grooves 256 in a manner that allows the seal slider 226 to pivot relative to the seal rotor 222 and/or relative to the seal stator 224. The seal slider 226 may pivot about one or more slider pins 254, for example, establishing and/or maintaining alignment between the slider face 232 and the rotor face 234, for example, responsive to a force acting upon the seal rotor 222 and/or the seal stator 224.

In some embodiments, the seal stator 224 may include a stator flange 258 and a slider flange 260. The stator flange 258 may be coupled to or defined by a stator 206 of a rotary machine 200, such as a turbine center frame 214 (FIG. 2A). Additionally, or in the alternative, the stator flange 258 may be coupled to or defined by a rotor 204 of a rotary machine 200, such as to an HP spool cone 212 and/or an inner extension 220 (FIG. 2B). The slider flange 260 may be configured to interface with the seal slider 226. For example, the one or more slider pins 254 may be defined by or coupled to the slider flange 260. The slider flange 260 may be coupled to the stator flange 258, or the slider flange 260 and the stator flange 258 may define respective portions of a single component, such as a monolithic component.

In some embodiments, the seal slider 226 may include a secondary seal flange 262. The secondary seal flange 262 may be coupled to the seal slider 226, such as to the stator-facing extension 252 of the seal slider 226. Alternatively, the secondary seal flange 262 may define a portion of the seal slider 226, such as a portion of the stator-facing extension 252. For example, the seal slider 226 and the secondary seal flange 262 may define respective portions of a single component, such as a monolithic component.

As shown, for example, in FIGS. 3A-3D, 4A-4D, and 5A-5E, the secondary seal 242 may be disposed between the seal stator 224 and the seal slider 226. In some embodiments, the secondary seal 242 may be coupled to the seal stator 224. For example, the secondary seal 242, such as a rotor-facing portion of the secondary seal 242, may be coupled to the slider flange 260 of the seal stator 224. Additionally, or in the alternative, the secondary seal 242 may be coupled to the seal slider 226. For example, the secondary seal 242, such as a stator-facing portion of the secondary seal 242, may be coupled to the secondary seal flange 262 of the seal slider 226. As described herein, the secondary seal 242 may be configured to exhibit forward and aft displacement and/or compression and rebound, such as under a compression load and/or a tension load, suitable for operation of the primary seal 230, such as under specified operating conditions of the rotary machine 200. The secondary seal 242 and/or one or more secondary sealing elements 246 thereof may be configured to inhibit or prevent fluid flow through the secondary seal 242, such as from the inlet plenum 208 to the outlet plenum 210.

In some embodiments, the secondary seal 242 and/or one or more secondary sealing elements 246 thereof may be impermeable to fluid. Additionally, or in the alternative, the secondary seal 242 and/or one or more secondary sealing elements 246 thereof may provide a fluid-tight seal, for example, at an interface with a portion of the seal slider 226, such as the secondary seal flange 262, and/or at an interface with a portion of the seal stator 224, such as the slider flange 260. For example, the secondary seal 242 and/or the one or more secondary sealing elements 246 may be coupled to the seal slider 226, such as to the secondary seal flange 262, for example, at a stator-facing portion of the secondary seal 242 and/or the one or more secondary sealing elements 246. Additionally, or in the alternative, the secondary seal 242 and/or the one or more secondary sealing elements 246 may be coupled to the seal stator 224, such as to the slider flange 260, for example, at a rotor-facing portion of the secondary seal 242 and/or the one or more secondary sealing elements 246. The secondary seal 242 and/or the one or more secondary sealing elements 246 may be coupled to the seal stator 224 and/or to the seal slider 226 by way of welding, brazing, attachment hardware, or the like. Additionally, or in the alternative, the secondary seal 242 and/or the one or more secondary sealing elements 246 may be seated in groove or the like defined by the seal slider 226 (such as by the secondary seal flange 262) that provides a fluid-tight seal therebetween. Additionally, or in the alternative, the secondary seal 242 and/or the one or more secondary sealing elements 246 may be seated in groove or the like defined by the seal stator 224 (such as by the slider flange 260) that provides a fluid-tight seal therebetween. In some embodiments, the secondary seal 242 and/or one or more secondary sealing elements 246 thereof may be permeable to fluid, while suitably inhibiting fluid flow therethrough, such as from the inlet plenum 208 to the outlet plenum 210.

In some embodiments, the secondary seal 242 and/or one or more secondary sealing elements 246 thereof may be disposed within a secondary seal plenum 264. The secondary seal plenum 264 may include a region defined at least in part by and disposed between the seal stator 224 and the seal slider 226. Additionally, or in the alternative, the secondary seal plenum 264 may include a region defined at least in part by and disposed between the slider flange 260 and the secondary seal flange 262. Additionally, or in the alternative, the secondary seal plenum 264 may include a region defined at least in part by and disposed between the stator flange 258 and the stator-facing extension 252. The secondary seal plenum 264 may fluidly communicate with the inlet plenum 208 and the outlet plenum 210 on opposite sides of the secondary seal 242 and/or one or more secondary sealing elements 246 thereof. The secondary seal 242 and/or the one or more secondary sealing elements 246 thereof may prevent or inhibit fluid from flowing through the secondary seal plenum 264, such as from one side to another side of the secondary seal 242 and/or the one or more secondary sealing elements 246 thereof.

In some embodiments, as shown, for example, in FIGS. 3A-3D, and 5A-5E, a seal assembly 202 may include one or more bellow seals 300. The one or more bellow seals 300 may define the secondary seal 242 and/or at least one of the one or more secondary sealing elements 246 of the secondary seal 242. The one or more bellow seals 300 may be impermeable to fluid. The one or more bellow seals 300 may be coupled to the seal slider 226, such as to the secondary seal flange 262, in a manner that provides a fluid impermeable seal and/or that suitably inhibits fluid flow therebetween. Additionally, or in the alternative, the one or more bellow seals 300 may be coupled to the seal stator 224, such as to the slider flange 260 in a manner that provides a fluid impermeable seal and/or that suitably inhibits fluid flow therebetween. Additionally, or in the alternative, the one or more bellow seals 300 may float in relation to the seal slider 226, such as to the secondary seal flange 262, and/or in relation to the seal stator 224, such as to the slider flange 260.

An exemplary bellow seal 300 may include a plurality of convolutions 302. The plurality of convolutions 302 may be formed from a plurality of adjacent disc-like plates that are affixed to one another, such as by welding, brazing, or the like, in an alternating manner at adjacent inward and outward edges. The plurality of convolutions 302 may include an end-fitting configured to interface with the seal stator 224 and/or the seal slider 226. The plurality of convolutions 302 and/or the plurality of disk-like plates of a bellow seal 300 may include contouring, such as ripples, corrugations, or the like, configured to influence the force constant, stroke length, off-axis rigidity, and/or resistance to fatigue. The plurality of convolutions 302 and/or the plurality of disk-like plates may include one or more plies. The plurality of convolutions 302 may any desired dimensions, such as material thickness, diameter, length, and so forth. Such dimensions of the plurality of convolutions 302 may be selected, for example, based on requires of the bellow seal 300 and/or the seal assembly 202. Additionally, or in the alternative, the plurality of convolutions 302 may have varying thickness, diameter, and/or height, across at least a portion of the bellow seal 300, for example, to provide a bellow seal 300 with a non-linear stiffness. In some embodiments, the bellow seal 300 may have a conical and/or curved cross-sectional profile. Additionally, or in the alternative, the plurality of convolutions 302 may have varying thickness, for example, to provide a bellow seal with a non-linear stiffness. The configuration and arrangement of the bellow seal 300 may be selected at least in part to provide a force constant with suitable compression and rebound for operation of the primary seal 230, such as under specified operating conditions of the rotary machine 200. In some embodiments, the slider flange 260 and/or the secondary seal flange 262 may respectively define an end-fitting of a bellow seal 300. Additionally, or in the alternative, the slider flange 260 and/or the secondary seal flange 262 may be configured to interface with a corresponding end-fitting of a bellow seal 300.

Figure 3A:
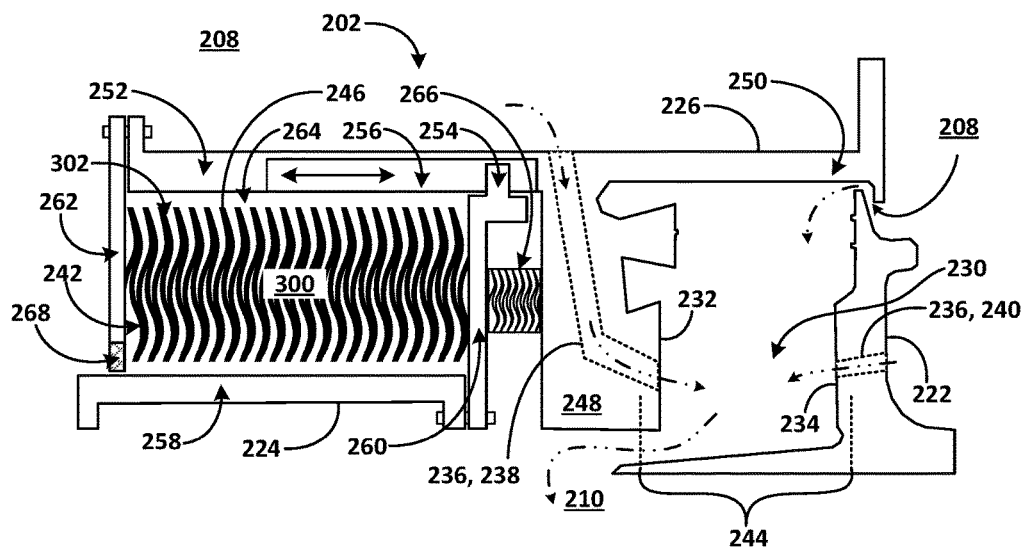
FIG. 3A shows a schematic side view of an exemplary seal assembly in a retracted position.
Figure 3B:
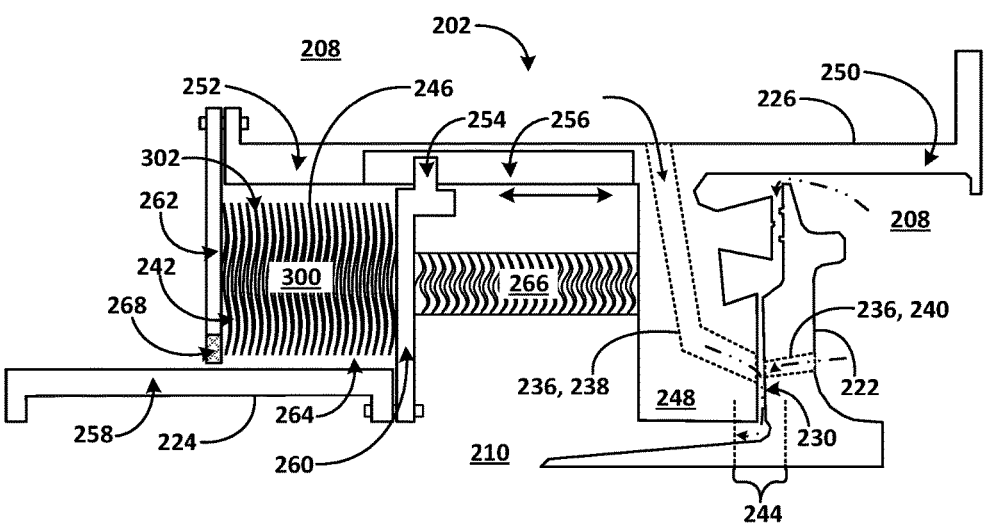
FIG. 3B shows a schematic side view of the exemplary seal assembly of FIG. 3A, in an engaged position.

FIG. 3A shows a seal assembly 202 that includes a bellow seal 300, with a seal slider 226 situated in a retracted position. FIG. 3B shows a seal assembly 202 that includes a bellow seal 300, with a seal slider 226 situated in an engaged position. In some embodiments, as shown in FIGS. 3A and 3B, a seal assembly 202 that includes one or more bellow seals 300 may be configured and arranged such that the convolutions 302 are at least partially compressed when the seal slider 226 moves from a retracted position towards an engaged position. The convolutions 302 may at least partially rebound when the seal slider 226 moves from an engaged position towards a retracted position. Additionally, or in the alternative, in some embodiments, a seal assembly 202 that includes one or more bellow seals 300 may be configured and arranged such that the convolutions 302 are at least partially compressed when the seal slider 226 moves from an engaged position towards a retracted position. The convolutions 302 may at least partially rebound when the seal slider 226 moves from a retracted position towards an engaged position.

In some embodiments, as shown, for example, in FIGS. 4A-4D, a seal assembly 202 may include one or more finger seals 400. The one or more finger seals 400 may define the secondary seal 242 and/or at least one of the one or more secondary sealing elements 246 of the secondary seal 242. In some embodiments, as shown, for example, in FIGS. 4A and 4B, one or more finger seals 400 may be coupled to the seal slider 226. Additionally, or in the alternative, one or more finger seals 400 may be coupled to the secondary seal flange 262. Additionally, or in the alternative, in some embodiments, the one or more finger seals 400 may be coupled to the seal stator 224, such as to the slider flange 260, as respectively shown in FIGS. 4C and 4D. The finger seal 400 may be coupled to the seal assembly 202, such as way of welding, brazing, attachment hardware, or the like, in a manner that provides a fluid impermeable seal and/or that suitably inhibits fluid flow therebetween. The finger seal 400 may include a plurality of fingers 402, such as bristles, filaments, leaflets, or the like. The plurality of fingers 402 may be configured and arranged in one or more layers and/or bunches.

Figure 4A:
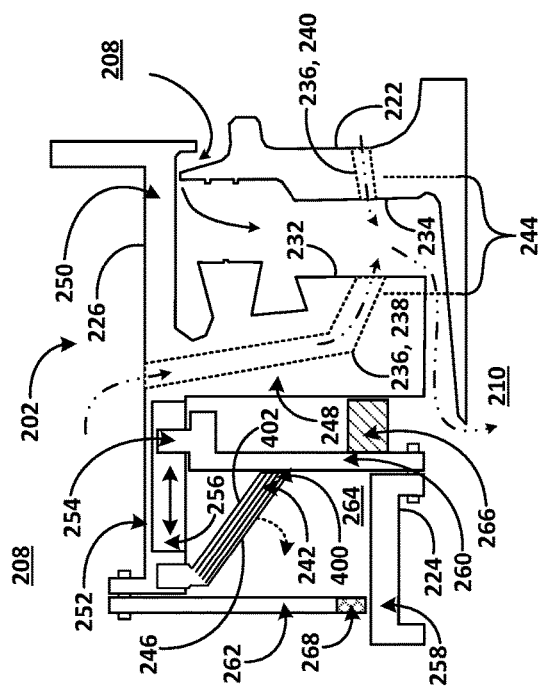
FIG. 4A shows a schematic side view of another exemplary seal assembly in a retracted position.
Figure 4B:
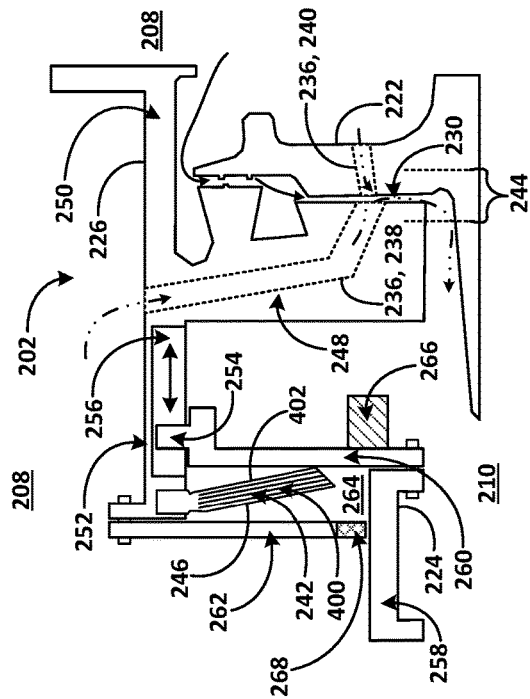
FIG. 4B shows a schematic side view of the exemplary seal assembly of FIG. 4A, in an engaged position.

The plurality of fingers 402 of the finger seal 400 may extend into the secondary seal plenum 264. The plurality of fingers 402 of the finger seal 400 may be oriented towards and/or about an opposing wall of the secondary seal plenum 264 when the seal slider 226 is positioned at a location along at least a portion of the range of motion of the seal slider 226. By way of example, FIG. 4A shows a seal assembly 202 that includes a finger seal 400, with a seal slider 226 situated in a retracted position. FIG. 4B shows a seal assembly 202 that includes a finger seal 400, with a seal slider 226 situated in an engaged position. The plurality of fingers 402 may suitably inhibit fluid flow from one side of the secondary seal plenum 264 to another, such as between respective ones of the plurality of fingers 402 and/or between the plurality of fingers 402 and an opposing wall of the secondary seal plenum 264.

In some embodiments, as shown in FIGS. 4A-4D, a seal assembly 202 that includes one or more finger seals 400 may be configured and arranged such that the fingers 402 flex when the seal slider 226 moves from a retracted position towards an engaged position. The fingers 402 may at least partially rebound when the seal slider 226 moves from an engaged position towards a retracted position. Additionally, or in the alternative, in some embodiments, a seal assembly 202 that includes one or more finger seals 400 may be configured and arranged such that the fingers 402 are at least partially compressed when the seal slider 226 moves from an engaged position towards a retracted position. The fingers 402 may at least partially rebound when the seal slider 226 moves from a retracted position towards an engaged position.

Figure 4C:
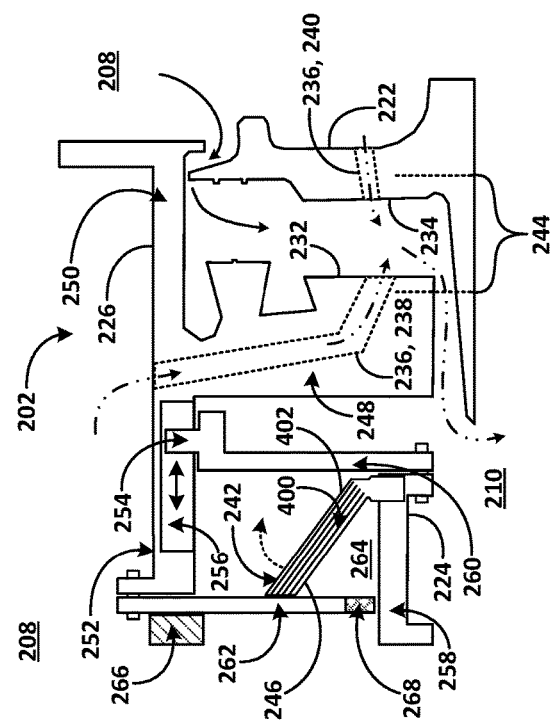
FIGS. 4C and 4D respectively show a schematic side view of further exemplary seal assemblies.
Figure 4D:
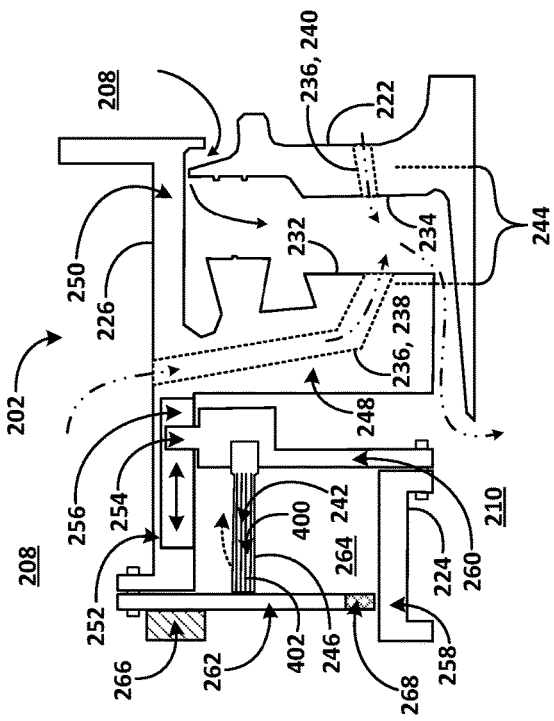

By way of example, as shown in FIGS. 4A and 4B, a finger seal 400 may be coupled to the seal slider 226, and the fingers 402 of the finger seal 400 may be oriented towards the slider flange 260. The fingers 402 may push against the slider flange 260 and may flex and rebound as a result of a force acting upon the fingers 402 by the slider flange 260 as the seal slider 226 moves between a retracted position and engaged position. As another example, as shown in FIG. 4C, a finger seal 400 may be coupled to the seal stator 224, and the fingers 402 of the finger seal 400 may be oriented towards the secondary seal flange 262. The fingers 402 may push against the secondary seal flange 262 and may flex and rebound as a result of a force acting upon the fingers 402 by the secondary seal flange 262 as the seal slider 226 moves between a retracted position and engaged position. As another example, as shown in FIG. 4D, a finger seal 400 may be coupled to the slider flange 260 of the seal stator 224, and the fingers 402 of the finger seal 400 may be oriented towards the secondary seal flange 262. The fingers 402 may push against the secondary seal flange 262 and may flex and rebound as a result of a force acting upon the fingers 402 by the secondary seal flange 262 as the seal slider 226 moves between a retracted position and engaged position.

Referring to FIGS. 3A and 3B, and FIGS. 4A-4D, in some embodiments, a seal assembly 202 may include one or more rebound dampers 266. The one or more rebound dampers 266 may exhibit elasticity within at least a portion of a range of motion of the seal slider 226. The one or more rebound dampers 266 may be configured to slow a rate of rebound of the seal slider 226, such as when the seal slider 226 moves from an engaged position to a retracted position. The one or more rebound dampers 266 may have an annular configuration defined by one or more annular or semi-annular components. Additionally, or in the alternative, a seal assembly 202 may include a plurality of rebound dampers 266 circumferentially spaced about one or more locations of the seal assembly 202.

The configuration and arrangement of the one or more rebound dampers 266 may be selected at least in part to provide a force constant with suitable compression and rebound for operation of the primary seal 230, such as under specified operating conditions of the rotary machine 200. In some embodiments, the rebound damper 266 may be configured as a bellow seal 300, as shown, for example, in FIGS. 3A and 3B. When the rebound damper 266 is configured as a bellow seal 300, the rebound damper 266 may include one or more features of a bellow seal 300 as described herein. In some embodiments, the rebound damper 266 may be configured as a bumper, a compression spring, or the like, as shown, for example, in FIGS. 3C and 3D, and FIGS. 4A-4D. The rebound damper 266 may be configured and arranged to be at least partially compressed when the seal slider 226 moves from an engaged position towards a retracted position. The rebound damper 266 may at least partially rebound when the seal slider 226 moves from a retracted position towards an engaged position. A rebound damper 266 may be coupled to a seal slider 226, such as to the primary seal body 248 of the seal slider 226, as shown, for example, in FIGS. 3A and 3B. Additionally, or in the alternative, the rebound damper 266 may be coupled to a stator flange 258, such as to a slider flange 260, also as shown, for example, in FIGS. 3A and 3B.

In some embodiments, the one or more rebound dampers 266 may define a portion of the secondary seal 242. For example, at least one of the one or more secondary sealing elements 246 of the secondary seal 242 may include or may be configured as a rebound damper 266. The one or more rebound dampers 266 may inhibit or prevent fluid from passing therethrough, such as from the secondary seal plenum 264 to the outlet plenum 210, for example, while allowing the seal slider 226 to slide forward and aft relative to the seal stator 224 and the seal rotor 222, such as between a retracted position and an engaged position, in accordance with operating conditions of the rotary machine 200.

In some embodiments, as shown, for example, in FIGS. 3A and 3B, the rebound damper 266 may provide a fluid-tight seal, for example, at an interface with the seal slider 226, such as the primary seal body 248, and/or at an interface with the seal stator 224, such as the slider flange 260. For example, the rebound damper 266 may be coupled to the seal slider 226, such as to the primary seal body 248, for example, at a rotor-facing portion of the rebound damper 266. Additionally, or in the alternative, the rebound damper 266 may be coupled to the seal stator 224, such as to the slider flange 260, for example, at a stator-facing portion of the rebound damper 266. The rebound damper 266 may be coupled to the seal stator 224 and/or to the seal slider 226 by way of welding, brazing, attachment hardware, or the like. Additionally, or in the alternative, the rebound damper 266 may be seated in groove or the like defined by the seal slider 226 (such as by the primary seal body 248) that provides a fluid-tight seal therebetween. Additionally, or in the alternative, the secondary seal 242 and/or the one or more secondary sealing elements 246 may be seated in groove or the like defined by the seal stator 224 (such as by the slider flange 260) that provides a fluid-tight seal therebetween.

In some embodiments, a rebound damper 266 configured as a bumper, a compression spring, or the like, may be coupled to a seal stator 224, such as to the slider flange 260 of the seal stator, as shown, for example, in FIGS. 3C and 3D, and FIGS. 4A and 4B. Additionally, or in the alternative, a rebound damper 266 configured as a bumper, a compression spring, or the like, may be coupled to a seal slider 226, such as to the primary seal body 248 of the seal slider 226. Additionally, or in the alternative, as shown, for example, in FIGS. 4C and 4D, a rebound damper 266 configured as a bumper, a compression spring, or the like, may be coupled to a seal slider 226, such as to the secondary seal flange 262 of the seal slider 226. A rebound damper 266 coupled to the secondary seal flange 262 of the seal slider 226 may be at least partially compressed as a result of a force acting upon the rebound damper 266 when the seal slider 226 moves from an engaged position towards a retracted position. By way of example, the force acting upon the rebound damper 266 may be imparted at least in part by a stator 206 of a rotary machine 200, such as a turbine center frame 214 (FIG. 2A). As another example, the force acting upon the rebound damper 266 may be imparted at least in part by a rotor 204 of a rotary machine 200, such as to an HP spool cone 212 and/or an inner extension 220 (FIG. 2B).

Still referring to FIGS. 3A-3D, FIGS. 4A-4D, and FIGS. 5A-5E, in some embodiments, a seal assembly 202 may include a tertiary seal 268. The tertiary seal 268 may be located between the inlet plenum 208 and the secondary seal 242. The tertiary seal 268 may be coupled to the seal stator 224 and/or the tertiary seal 268 may define a portion of the seal stator 224. Additionally, or in the alternative, the tertiary seal may be coupled to the seal slider 226 and/or the tertiary seal 268 may define a portion of the seal slider 226. The tertiary seal 268 may define a tertiary seal interface between the seal stator 224 and the seal slider 226. The tertiary seal interface defined by the tertiary seal 268 may inhibit fluid flow from the inlet plenum 208 to the secondary seal plenum 264. Additionally, or in the alternative, the tertiary seal interface defined by the tertiary seal 268 may inhibit contaminants in the fluid from obstructing or fouling the secondary seal 242. As shown, for example, in FIGS. 3A-3D and FIGS. 4A-4D, the seal interface defined by the tertiary seal 268 may be located between the stator flange 258 of the seal stator 224 and the secondary seal flange 262 of the seal slider 226. Additionally, or in the alternative, as shown, for example, in FIGS. 5A-5E, the seal interface defined by the tertiary seal 268 may be located between the secondary seal flange 262 of the seal slider 226 and the slider flange 260 of the seal stator 224.

In some embodiments, a tertiary seal 268 may be coupled to the seal slider 226, such as to the secondary seal flange 262, as shown, for example, in FIGS. 3A-3D and FIGS. 4A-4D. Additionally, or in the alternative, in some embodiments, a tertiary seal 268 may be coupled to the seal stator 224, such as to the slider flange 260, as shown, for example, in FIGS. 5A-5E. In some embodiments, the tertiary seal 268 may include a brush seal, a finger seal, or the like. Additionally, or in the alternative, the tertiary seal 268 may include a labyrinth seal, a lip seal, or the like. Additionally, or in the alternative, the tertiary seal 268 may include a ring seal, such as a carbon ring seal or a graphite ring seal. In some embodiments, the tertiary seals 268 shown in FIGS. 3A-3D and/or FIGS. 4A-4D may include as a brush seal, a finger seal, or the like. The tertiary seal 268 shown in FIGS. 3A-3D and/or FIGS. 4A-4D may include flexible bristles, filaments, leaflets, fabric, screen, or the like. In some embodiments, the tertiary seals 268 shown in FIGS. 5A-5E may include a ring seal, such as a carbon ring seal or a graphite ring seal. In some embodiments, a tertiary seal 268, such as the tertiary seals 268 shown in FIGS. 5A-5E, may support the seal slider 226 across at least a portion of a range of motion of the seal slider 226, such as to the stator-facing extension 252 and/or to the secondary seal flange 262 of the seal slider 226. Additionally, or in the alternative, a tertiary seal 268, such as the tertiary seals 268 shown in FIGS. 5A-5E, may provide a contacting and/or a non-contacting interface with the seal slider 226, such as under specified operating conditions of the rotary machine 200.

In some embodiments, the tertiary seal 268 may inhibit or prevent debris from accumulating within the secondary sealing element 246 and/or within other portions of the seal assembly 202. For example, for a secondary sealing element 246 that includes a bellow seal 300, the tertiary seal 268 may inhibit or prevent debris from accumulating between the plurality convolutions 302 of the bellow seal 300. As another example, for a secondary sealing element 246 that includes a finger seal 400, the tertiary seal 268 may inhibit or prevent debris from passing through the plurality of fingers 402, such as bristles, filaments, leaflets, or the like, of the finger seal 400. By way of illustration, the tertiary seal 268 may include flexible bristles, filaments, leaflets, fabric, screen, or the like, such as in a plurality of layers that allows air to pass therethrough while inhibiting or preventing debris from passing therethrough. The flexible bristles, filaments, leaflets, fabric, screen, or the like may be provided in a plurality of layers, for example, that inhibit or prevent direct axial flow therethrough, and, for example, provide a convoluted flowpath therethrough.

As shown in FIGS. 5A-5E, in some embodiments, a seal assembly 202 may include a seal rotor 222, a seal stator 224, and a seal slider 226. As shown, the seal assembly 202 may include a primary seal 230, a secondary seal 242, and a tertiary seal 268. The primary seal 230 may include an aspirating face seal, a fluid bearing, a gas bearing, or the like. The primary seal 230 may be defined between a slider face 232 and a rotor face 234. The secondary seal 242 may include a bellow seal 300. The bellow seal 300 may be disposed between the seal stator 224 and the seal slider 226, such as between the primary seal body 248 of the seal slider 226 and the slider flange 260 of the seal slider 226. The tertiary seal 268 may include a ring seal, such as a carbon ring seal or a graphite ring seal.

In some embodiments, as shown, for example, in FIG. 5A-5E, the seal slider 226, such as the secondary seal flange 262 of the seal slider 226, may be configured to engage with the tertiary seal 268 and/or with the seal stator 224, such as with the slider flange 260 of the seal stator 224, over at least a portion of the range of motion of the seal slider 226. The seal slider 226, such as the secondary seal flange 262 of the seal slider 226, may be configured to be nonengaged with the tertiary seal 268 and/or from the seal stator 224, such as from the slider flange 260 of the seal stator 224, over at least a portion of the range of motion of the seal slider 226. Additionally, or in the alternative, the seal slider 226, such as the secondary seal flange 262 of the seal slider 226, may exhibit an overlapping relationship with at least a portion of the seal stator 224 and/or the tertiary seal 268, over at least a portion of the range of motion of the seal slider 226. Additionally, or in the alternative, the seal slider 226, such as the secondary seal flange 262 of the seal slider 226, may exhibit a nonoverlapping relationship with at least a portion of the tertiary seal 268 and/or with at least a portion of the seal stator 224, such as with the slider flange 260 of the seal stator 224, over at least a portion of the range of motion of the seal slider 226. In some embodiments, a seal assembly 202 may exhibit a longitudinal separation between the secondary seal flange 262 of the seal slider 226 and a first rotor-facing wall 270 located circumferentially adjacent to the secondary seal flange 262 of the seal slider 226, over at least a portion of the range of motion of the seal slider 226. The first rotor-facing wall 270 may be defined by a portion of the seal stator 224 and/or by a portion of the tertiary seal 268. The longitudinal separation therebetween may define a secondary seal plenum-inlet gap 272. The inlet plenum 208 may fluidly communicate with the secondary seal plenum 264, for example, by way of the secondary seal plenum-inlet gap 272.

In some embodiments, as shown, for example, in FIGS. 5A-5E, the secondary seal 242 may include a secondary sealing element 246 coupled to the seal slider 226, such as to the primary seal body 248 of the seal slider 226. For example, a rotor-facing portion of the secondary sealing element 246 may be coupled to the seal slider 226, such as to the primary seal body 248 of the seal slider 226. The secondary sealing element 246 may be decoupled from the seal stator 224, such that the secondary sealing element 246 may float in relation to the seal stator 224 over at least a portion of the range of motion of the seal slider 226. For example, a stator-facing portion of the secondary sealing element 246 may be decoupled from the seal stator 224 and may float in relation to the seal stator 224. In some embodiments, the secondary sealing element 246 may include a bellow seal 300. The secondary sealing element 246 may be configured to engage with the seal stator 224 over at least a portion of the range of motion of the seal slider 226. The secondary sealing element 246 may be configured to be nonengaged with the seal stator 224 over at least a portion of the range of motion of the seal slider 226. For example, the secondary sealing element 246 may be configured to be nonengaged with the seal stator 224 when the rotary machine 200 operates at idle or otherwise has a low-power operating state. Additionally, or in the alternative, the secondary sealing element 246, may exhibit an overlapping relationship with at least a portion of the seal stator 224, such as with the stator flange 258 of the seal stator 224, over at least a portion of the range of motion of the seal slider 226. For example, the secondary sealing element 246 may be configured to exhibit an overlapping relationship with the seal stator 224 when the rotary machine 200 operates under cruise operating conditions or otherwise has a medium-power or high-efficiency operating state, and/or when the rotary machine 200 at a rated speed or otherwise has a high-power operating state. Additionally, or in the alternative, the secondary sealing element 246, may exhibit a nonoverlapping relationship with at least a portion of the seal stator 224, such as with the stator flange 258 of the seal stator 224, over at least a portion of the range of motion of the seal slider 226, for example, with the secondary sealing element 246 disengaged from the seal stator 224. In some embodiments, a seal assembly 202 may exhibit a longitudinal separation between the secondary sealing element 246 and a second rotor-facing wall 274. The second rotor-facing wall 274 may be defined by a portion of the seal stator 224, such as the stator flange 258, located circumferentially adjacent to the secondary sealing element 246. The longitudinal separation therebetween may define a secondary seal plenum-outlet gap 276. The secondary seal plenum 264 may fluidly communicate with the outlet plenum 210, for example, by way of the secondary seal plenum-outlet gap 276. By way of example, the secondary sealing element 246 may exhibit a nonoverlapping relationship with at least a portion of the seal stator 224, and/or the seal assembly 202 may exhibit a longitudinal separation between the secondary sealing element 246 and a second rotor-facing wall 274, when the rotary machine 200 operates at idle or otherwise has a low-power operating state. In some embodiments, the tertiary seal 268 may define a primary flow restriction of the seal assembly 202 during at least some operating conditions of the rotary machine, such as when the rotary machine 200 operates at idle or otherwise has a low-power operating state. For example, the tertiary seal 268 may define a primary flow restriction of the seal assembly 202 when the secondary sealing element 246 is nonengaged with the seal stator 224, when the secondary sealing element 246 exhibits a longitudinal separation between the secondary sealing element 246 and a second rotor-facing wall 274, and/or when the longitudinal separation between the secondary sealing element 246 and a second rotor-facing wall 274 defines a secondary seal plenum-outlet gap 276.

Still referring to FIGS. 5A-5E, in some embodiments, the seal assembly 202 may include one or more rebound dampers 266. The one or more rebound dampers may be disposed between the seal stator 224 and a secondary sealing element 246. In some embodiments, a rebound damper 266 may define a secondary sealing element 246. The rebound damper 266 may be configured as a bellow seal 300. The rebound damper may be coupled to the seal stator 224. The rebound damper 266 may be decoupled from a secondary sealing element 246 disposed adjacent to the rebound damper 266, such as between the rebound damper 266 and the primary seal body 248 of the seal slider 226. In some embodiments, a first secondary sealing element 246, such as a rebound damper 266, may be coupled to the seal stator 224 and a second secondary sealing element 246 may be coupled to the seal slider 226, such as to the primary seal body 248 of the seal slider 226. The first secondary sealing element 246 may abut or contact the second secondary sealing element 246, for example, over at least a portion of the range of motion of the seal slider 226. The first secondary sealing element 246 may be coupled to the second secondary sealing element 246. Alternatively, the first secondary sealing element 246 may be decoupled to the second secondary sealing element 246. Additionally, or in the alternative, the first secondary sealing element 246 and the second secondary sealing element 246 may be configured to be nonengaged with one another over at least a portion of the range of motion of the seal slider 226.

In some embodiments, a secondary seal 242 and/or a secondary sealing element 246 thereof may include an intermediate flange 278. The intermediate flange 278 may be coupled to one or more secondary sealing elements 246. The intermediate flange 278 may be disposed between adjacent secondary sealing elements 246. The intermediate flange 278 may engage with the seal stator 224. The intermediate flange 278 may include a quaternary seal 280. The quaternary seal 280 may be coupled to the intermediate flange 278 and/or the quaternary seal 280 may define a portion of the intermediate flange 278. The quaternary seal 280 may define a quaternary seal interface with the seal stator 224. The quaternary seal interface defined by the quaternary seal 280 may inhibit fluid flow from the secondary seal plenum 264 to the outlet plenum 210. Additionally, or in the alternative, the quaternary seal interface defined by the quaternary seal 280 may inhibit contaminants in the fluid from obstructing or fouling the secondary seal 242 and/or from passing into the outlet plenum 210.

Still referring to FIGS. 5A-5E, a position of one or more components of a seal assembly 202 may be described with reference to a radial axis 500. It will be appreciated that the seal assemblies shown in FIGS. 3A-3D and 4A-4D may also be described with reference to a radial axis 500 and that the description with reference to FIGS. 5A-5E is provided by way of example and not to be limiting. As shown, for example, in FIG. 5A, a seal assembly 202 may exhibit a neutral position, for example, when a rotary machine 200 is in a shutdown or non-operating state. In a neutral position, the slider face 232 of the primary seal body 248 may be disengaged from the rotor face 234 of the seal rotor 222. The secondary seal 242 may be in a relaxed or preloaded state. When the secondary seal 242 includes a secondary sealing element 246 that is decoupled from the seal stator 224 at the stator-facing side, such stator-facing side of the secondary sealing element 246 may abut or contact the seal stator 224 and/or a rebound damper 266 disposed between the seal stator 224 and the secondary sealing element 246. The stator-facing extension 252 of the seal slider 226 may interface with the seal stator 224 and/or with a tertiary seal 268 disposed between the seal stator and the stator-facing extension 252. By way of example, the seal assembly 202 may exhibit a neutral position when a pressure difference between the inlet plenum 208 and the outlet plenum 210 is about zero psi, such as from about −5 psi to about 5 psi. By way of example, in a neutral position, a distance between the slider face 232 and the rotor face 234 may be from about 5 mm to about 15 mm, or such as from about 8 mm to about 12 mm.

Figure 5A:
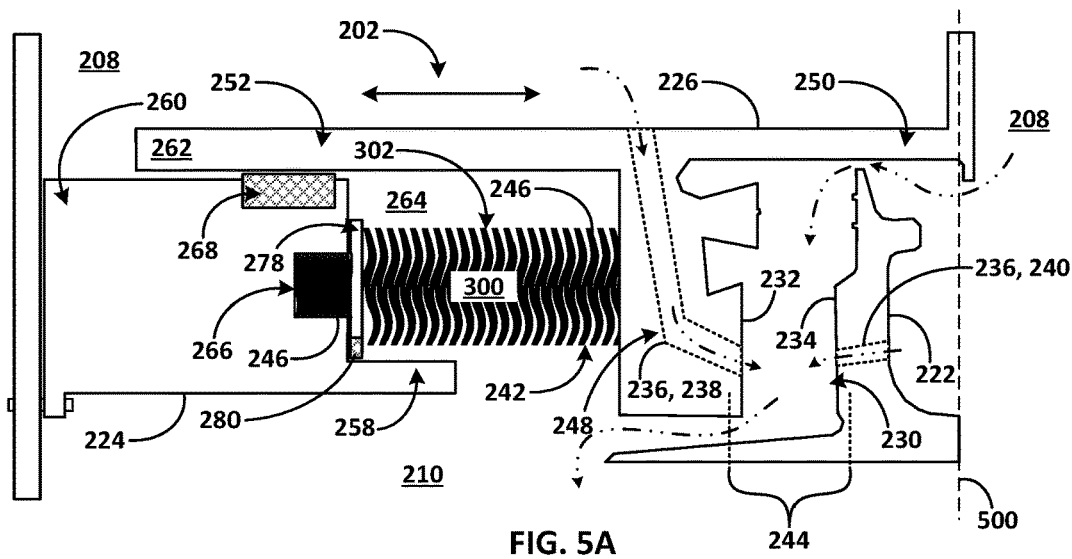
FIG. 5A shows a schematic side view of yet another exemplary seal assembly in a neutral position.
Figure 5B:
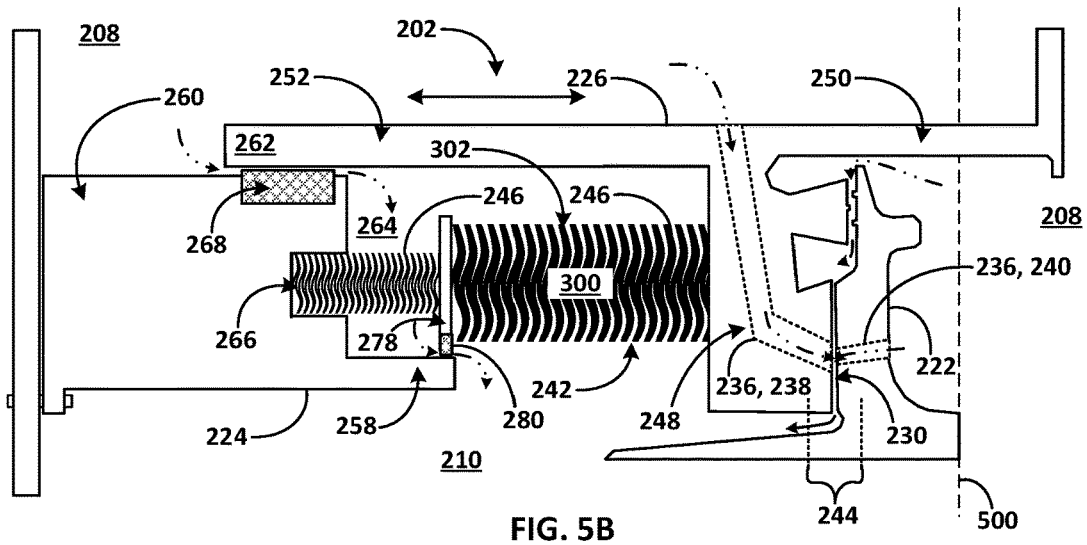
FIG. 5B shows a schematic side view of the exemplary seal assembly of FIG. 5A, in an idle position.

As shown, for example, in FIG. 5B, a seal assembly 202 may exhibit an idle position, for example, when a rotary machine 200 is operating at idle or otherwise has a low-power operating state. In an idle position, the seal slider 226 may move towards the seal rotor 222, such that the slider face 232 of the primary seal body 248 engages with the rotor face 234 of the seal rotor 222, defining a primary seal 230 with a non-contacting interface, such as an aspirating face seal, a fluid bearing, a gas bearing, or the like. The secondary seal 242 may be in a relaxed or preloaded state. When the secondary seal 242 includes a secondary sealing element 246 that is decoupled from the seal stator 224 at the stator-facing side, such stator-facing side of the secondary sealing element 246 may be nonengaged with the seal stator 224 and/or a rebound damper 266 disposed between the seal stator 224 and the secondary sealing element 246. Additionally, or in the alternative, as shown, the intermediate flange 278 and/or a quaternary seal 280 coupled to the intermediate flange may engage with the seal stator 224, such as with the stator flange 258 of the seal stator 224. The stator-facing extension 252 of the seal slider 226 may interface with the seal stator 224 and/or with a tertiary seal 268 disposed between the seal stator and the stator-facing extension 252. By way of example, the seal assembly 202 may exhibit an idle position when a pressure difference between the inlet plenum 208 and the outlet plenum 210 is from about 1 psi to about 20 psi, such as from about 1 psi to about 10 psi, such as from about 5 psi to about 15 psi, or such as from about 10 psi to about 20 psi. By way of example, in an idle position, the seal slider 226 may move towards the seal rotor 222 and/or away from the seal stator 224 by a distance of from about 5 mm to about 15 mm, or such as from about 8 mm to about 12 mm. By way of example, in an idle position, a distance between the slider face 232 and the rotor face 234 may be from about 10 micrometers (rim) to about 100 μm, such as from about 25 μm to about 75 μm, or such as from about 40 μm to about 60 μm.

Figure 5C:
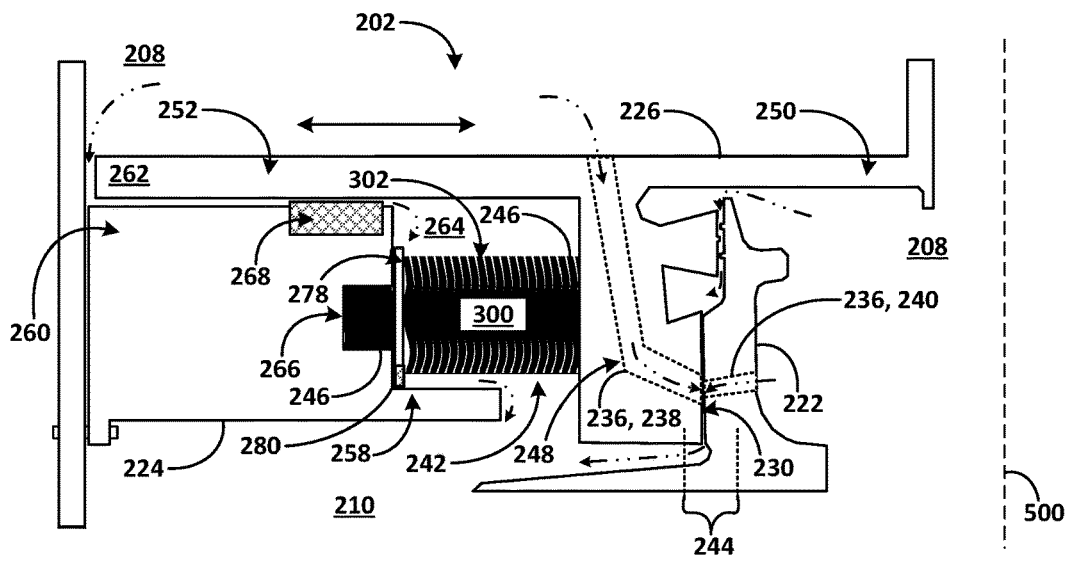
FIG. 5C shows a schematic side view of the exemplary seal assembly of FIG. 5A, in a rated speed position.

As shown, for example, in FIG. 5C, a seal assembly 202 may exhibit a rated speed position, for example, when a rotary machine 200 is operating at a rated speed or otherwise has a high-power operating state. In a rated speed position, the seal rotor 222 may move towards the seal stator 224 and/or the seal slider 226, forcing the seal slider 226 to move towards the seal stator 224 relative to the position of the seal slider 226 in the idle position. When the secondary seal 242 includes a secondary sealing element 246 that is decoupled from the seal stator 224 at the stator-facing side, such stator-facing side of the secondary sealing element 246 may abut or contact the seal stator 224 and/or a rebound damper 266 disposed between the seal stator 224 and the secondary sealing element 246. Additionally, or in the alternative, the secondary sealing element 246 and/or the rebound damper 266 may at least partially compress, for example, under a force acting upon the seal slider 226 at least in part by the seal rotor 222. The slider face 232 of the primary seal body 248 may remain engaged with the rotor face 234 of the seal rotor 222, defining a primary seal 230 with a non-contacting interface, such as an aspirating face seal, a fluid bearing, a gas bearing, or the like. The stator-facing extension 252 of the seal slider 226 may remain interfaced with the seal stator 224 and/or with a tertiary seal 268. By way of example, the seal assembly 202 may exhibit a rated speed position when a pressure difference between the inlet plenum 208 and the outlet plenum 210 is from about 40 psi to about 100 psi, such as from about 50 psi to about 90 psi, or such as from about 75 psi to about 85 psi. By way of example, in a rated speed position, the seal rotor 222 may move towards the seal slider 226 and/or the seal stator 224, and the seal slider 226 may move towards the seal stator 224 by a distance of from about 2 mm to about 10 mm, or such as from about 4 mm to about 8 mm. By way of example, in a rated speed position, a distance between the slider face 232 and the rotor face 234 may be from about 10 μm to about 100 μm, such as from about 25 μm to about 75 μm, or such as from about 40 μm to about 60 μm.

As shown, for example, in FIG. 5D, a seal assembly 202 may exhibit a cruise position, for example, when a rotary machine 200 is operating under cruise operating conditions or otherwise has a medium-power or high-efficiency operating state. In a cruise position, the seal rotor 222 may move away from the seal stator 224, allowing the seal slider 226 to move away from the seal stator 224 relative to the position of the seal slider 226 in the rated speed position. When the secondary seal 242 includes a secondary sealing element 246 that is decoupled from the seal stator 224 at the stator-facing side, such stator-facing side of the secondary sealing element 246 may disengage from the seal stator 224 and/or the rebound damper 266 disposed between the seal stator 224 and the secondary sealing element 246. Additionally, or in the alternative, as shown, the intermediate flange 278 and/or a quaternary seal 280 coupled to the intermediate flange may engage with the seal stator 224, such as with the stator flange 258 of the seal stator 224. The slider face 232 of the primary seal body 248 may remain engaged with the rotor face 234 of the seal rotor 222, defining a primary seal 230 with a non-contacting interface, such as an aspirating face seal, a fluid bearing, a gas bearing, or the like. The stator-facing extension 252 of the seal slider 226 may remain interfaced with the seal stator 224 and/or with a tertiary seal 268. By way of example, the seal assembly 202 may exhibit a cruise position when a pressure difference between the inlet plenum 208 and the outlet plenum 210 is from about 15 psi to about 60 psi, such as from about 20 psi to about 40 psi, or such as from about 25 psi to about 35 psi. By way of example, in a cruise position, the seal rotor 222 may retract from the seal stator 224 such that the seal rotor 222 remains shifted towards the seal stator 224 by a distance of from about 1 mm to about 6 mm, such as from about 2 mm to about 4 mm. By way of example, in a rated speed position, a distance between the slider face 232 and the rotor face 234 may be from about 10 μm to about 100 μm, such as from about 25 μm to about 75 μm, or such as from about 40 μm to about 60 μm.

As shown, for example, in FIG. 5E, a seal assembly 202 may exhibit a relief position, for example, when a rotary machine 200 encounters an upset condition such as a sudden change in operating conditions, an over-power state, or the like. In a relief position, the seal rotor 222 may move away from the seal stator 224, for example, in a negative direction relative to a radial axis 500, allowing the seal slider 226 to move away from the seal stator 224 relative to the position of the seal slider 226 in the cruise position. When the secondary seal 242 includes a secondary sealing element 246 that is decoupled from the seal stator 224 at the stator-facing side, such stator-facing side of the secondary sealing element 246 may remain disengaged from the seal stator 224 and/or the rebound damper 266 disposed between the seal stator 224 and the secondary sealing element 246. In some embodiments, the stator-facing extension 252 of the seal slider 226 may disengage from the seal stator 224 and/or from the tertiary seal 268, for example, providing a secondary seal plenum-inlet gap 272. Additionally, or in the alternative, the intermediate flange 278 and/or a quaternary seal 280 coupled to the intermediate flange may disengage from the seal stator 224, such as from the stator flange 258 of the seal stator 224, for example, providing a secondary seal plenum-outlet gap 276. Fluid communication between the inlet plenum 208 and the secondary seal plenum 264, and/or between the secondary seal plenum 264 and the outlet plenum 210 may allow a pressure differential to at least partially equalize. Additionally, or in the alternative, such fluid communication may alleviate a force acting on the primary seal 230, for example, protecting the primary seal from damage or excessive wear. When the seal assembly 202 exhibits a relief position, the slider face 232 of the primary seal body 248 may remain engaged with the rotor face 234 of the seal rotor 222, continuing to define a primary seal 230 with a non-contacting interface, such as an aspirating face seal, a fluid bearing, a gas bearing, or the like. By way of example, the seal assembly 202 may exhibit a relief position when a pressure difference between the inlet plenum 208 and the outlet plenum 210 is from about 60 psi to about 120 psi, such as from about 80 psi to about 100 psi. By way of example, in a relief position, the seal rotor 222 may retract from the seal stator 224 such that the seal rotor 222 moves past the radial axis 500 by a distance of from about 1 mm to about 10 mm, such as from about 2 mm to about 5 mm, or such as from about 5 mm to about 10 mm. By way of example, in a rated speed position, a distance between the slider face 232 and the rotor face 234 may be from about 10 μm to about 100 μm, such as from about 25 μm to about 75 μm, or such as from about 40 μm to about 60 μm.

Figure 3C:
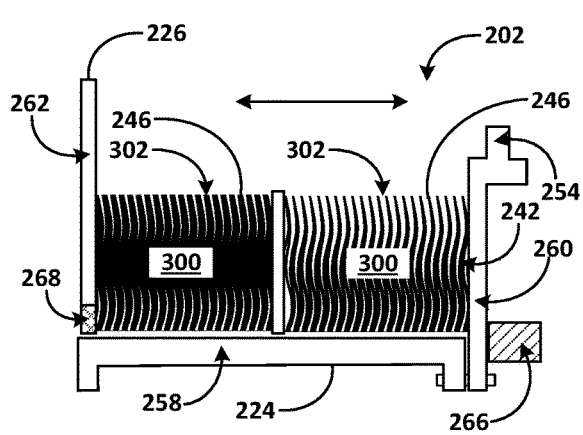
FIGS. 3C and 3D respectively show a schematic side view of additional exemplary seal assemblies.

It will be appreciated that the seal assemblies 202 shown in FIGS. 3A-3D, 4A-4D, and 5A-5E are provided by way of example and not to be limiting, and that various features of the seal assemblies 202 described herein may be exchanged and/or interchanged. In some embodiments, a secondary seal 242 may include one or more bellow seals 300 and one or more finger seals 400. For example, the embodiments shown in FIGS. 3A-3D, and 5A-5E may include a finger seal 400 in addition to the one or more bellow seals 300 shown. As another example, the embodiments shown in FIGS. 4A-4D may include one or more bellow seals 300 in addition to the one or more finger seals 400 shown. The one or more bellow seals 300 and the one or more finger seals 400 may respectively define a secondary sealing element 246. For example, while FIG. 3C shows a plurality of secondary sealing elements 246, such as a plurality of bellow seals 300, arranged in series, it will be appreciated that a seal assembly 202 may additionally or alternatively include one or more bellow seals 300 and one or more finger seals 400 arranged in series. In some embodiments, a seal assembly 202 that includes a bellow seal 300 and a finger seal 400 arranged in series may have a shorter axial length, which may allow the seal assembly 202 to be fitted within a relatively smaller area of a rotary machine 200. Additionally, or in the alternative, a seal assembly 202 that includes a bellow seal 300 and a finger seal 400 arranged in series may allow for the secondary sealing elements 246 to exhibit a variable force constant, for example, as between the bellow seal 300 and the finger seal 400, for example, providing a variable force constant over at least a portion of a range of motion of the secondary sealing element 246 as may be suitable for the particular implementation of the seal assembly 202.

Figure 3D:
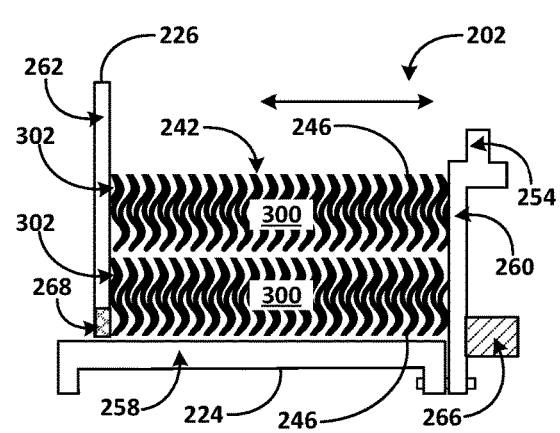

As another example, while FIG. 3D shows a plurality of secondary sealing elements 246, such as a plurality of bellow seals 300, arranged in parallel it will be appreciated that a seal assembly 202 may additionally or alternatively include one or more bellow seals 300 and one or more finger seals 400 arranged in parallel. The plurality of secondary sealing elements 246 may have the same force constant or different force constants. In some embodiments, a seal assembly 202 that has a plurality of secondary sealing elements 246 arranged in parallel may have a shorter axial length, which may allow the seal assembly 202 to be fitted within a relatively smaller area of a rotary machine 200. Additionally, or in the alternative, a seal assembly 202 that has a plurality of secondary sealing elements 246 arranged in parallel may allow for secondary sealing elements 246, such as bellow seals 300 and/or finger seals 400, that have a relatively shorter axial length and/or that have a relatively lower force constant, but that together provide a relatively higher force constant suitable for the particular implementation of the seal assembly 202.

Figure 6A:
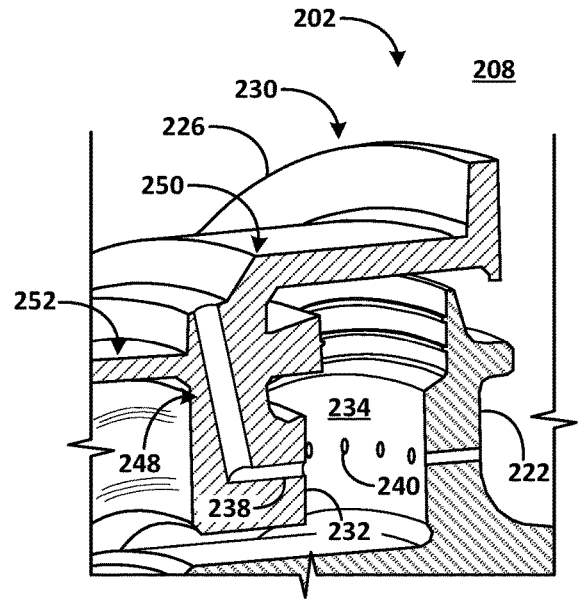
FIG. 6A shows a schematic cutaway cross-sectional perspective view depicting a primary seal of an exemplary seal assembly.
Figure 6B:
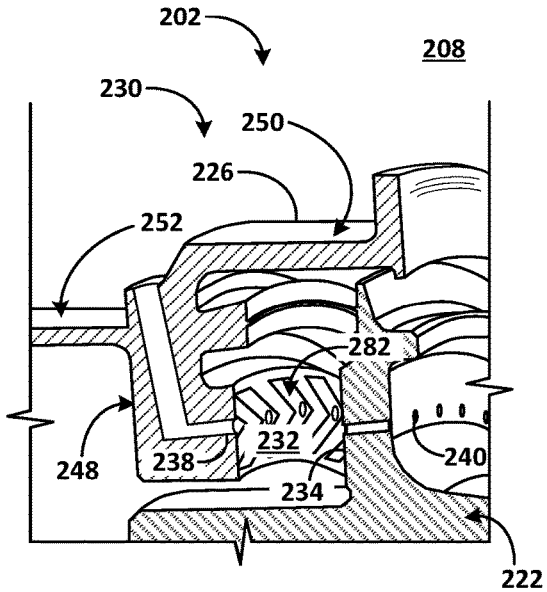
FIG. 6B shows a schematic cutaway cross-sectional alternate perspective view depicting the primary seal of the exemplary seal assembly of FIG. 6A.
Figure 6C:
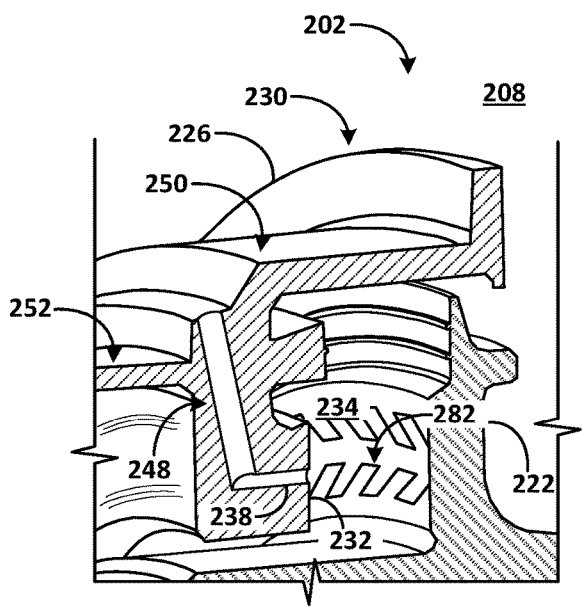
FIG. 6C shows a schematic cutaway cross-sectional perspective view depicting a primary seal of another exemplary seal assembly.
Figure 6D:
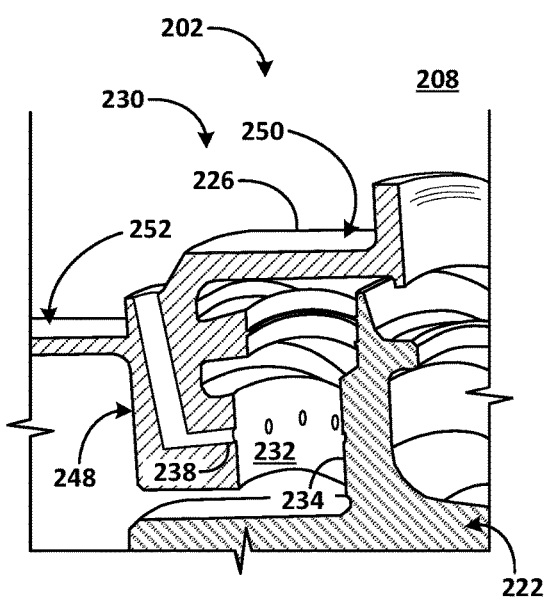
FIG. 6D shows a schematic cutaway cross-sectional alternate perspective view depicting the primary seal of the exemplary seal assembly of FIG. 6C.
Figure 6E:
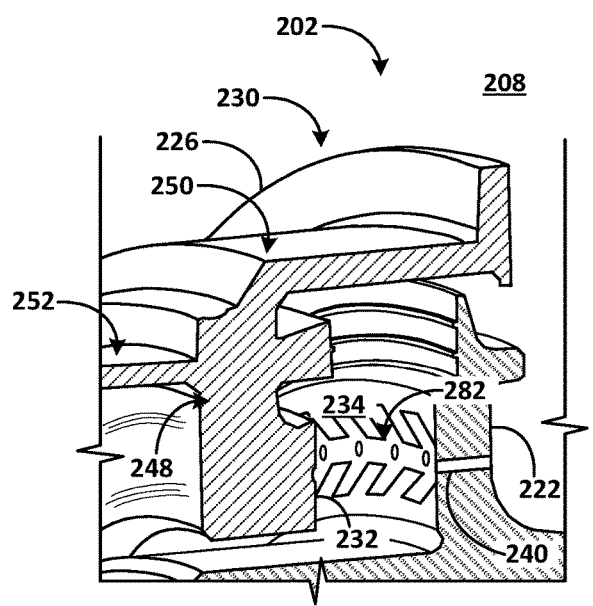
FIG. 6E shows a schematic cutaway cross-sectional perspective view depicting a primary seal of yet another exemplary seal assembly.
Figure 6F:
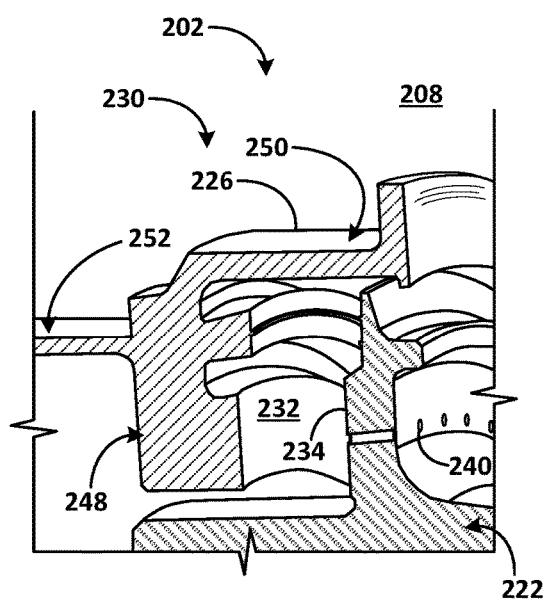
FIG. 6F shows a schematic cutaway cross-sectional alternate perspective view depicting the primary seal of the exemplary seal assembly of FIG. 6E.

Referring now to FIGS. 6A-6F, exemplary primary seals 230 are further described. In some embodiments, as shown, for example, in FIGS. 6A and 6B, a seal slider 226 may include a plurality of slider-aspiration conduits 238 configured to supply fluid to the primary seal 230. Additionally, or in the alternative, a seal rotor 222 may include a plurality of rotor-aspiration conduits 240 configured to supply fluid to the primary seal 230. As shown in FIG. 6B, the slider face 232 may include a plurality of aspiration channels 282 configured to distribute fluid about the primary seal 230, such as fluid from the slider-aspiration conduits 238 and/or fluid from the rotor-aspiration conduits 240. In some embodiments, as shown, for example in FIG. 6A, the rotor face 234 may be provided without aspiration channels 282. In some embodiments, as shown, for example, in FIGS. 6C and 6D, a seal slider 226 may include a plurality of slider-aspiration conduits 238 configured to supply fluid to the primary seal 230, and a seal rotor 222 may include a plurality of aspiration channels 282 configured to distribute fluid about the primary seal 230, such as fluid from the slider-aspiration conduits 238. In some embodiments, as shown, for example in FIG. 6D, the slider face 232 may be provided without aspiration channels 282. In some embodiments, as shown, for example, in FIGS. 6E and 6F, a seal assembly 202 may include a seal rotor 222 that includes a plurality of rotor-aspiration conduits 240 configured to supply fluid to the primary seal 230. The seal rotor 222 may include a plurality of aspiration channels 282 configured to distribute fluid about the primary seal 230, such as fluid from the rotor-aspiration conduits 240. In some embodiments, the seal assembly 202 may include a seal slider 226 that is provided without slider-aspiration conduits 238. It will be appreciated that the primary seals 230 shown in FIGS. 6A-6F are provided by way of example and not to be limiting. In some embodiments, a seal assembly may include a plurality of primary seals 230, such as a plurality of aspirating face seals, fluid bearings, gas bearings, or the like. The plurality of primary seals 230 may be arranged in series or parallel.

Figure 7:
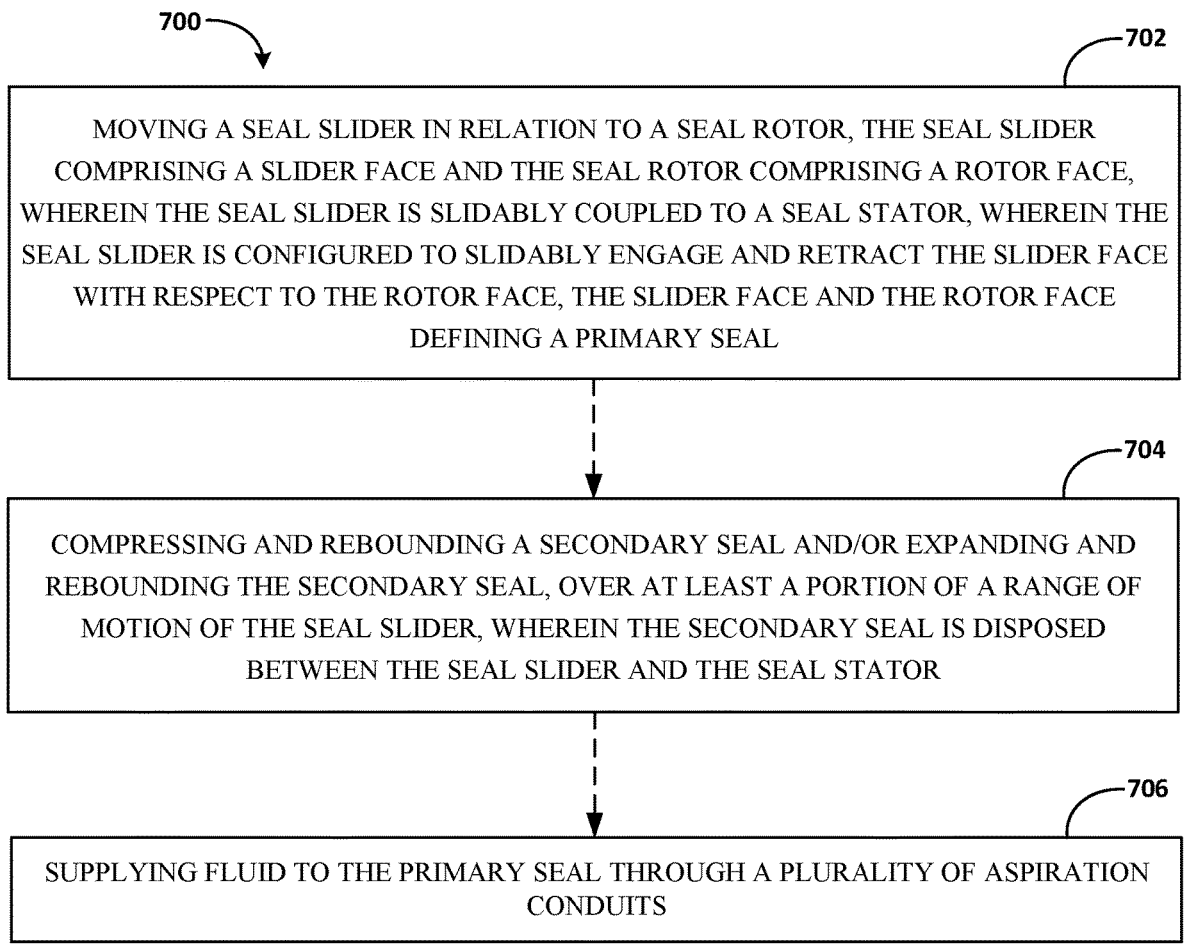
FIG. 7 shows a flow chart depicting a method of operating a rotary machine.

Now referring to FIG. 7, exemplary methods of operating a rotary machine 200, such as a turbine engine 100, are described. As shown in FIG. 7, an exemplary method 700 may include, at block 702, moving a seal slider 226 in relation to a seal rotor 222. The seal slider 226 may include a slider face 232 and the seal rotor 222 may include a rotor face 234. The seal slider 226 may be slidably coupled to a seal stator 224. The seal slider 226 may be configured to slidably engage and retract the slider face 232 with respect to the rotor face 234. The slider face 232 and the rotor face 234 may define a primary seal 230. The exemplary method 700 may include, at block 704, compressing and rebounding a secondary seal 242 over at least a portion of a range of motion of the seal slider 226, and/or expanding and rebounding the secondary seal 242 over at least a portion of the range of motion of the seal slider 226. The secondary seal 242 may be disposed between the seal slider 226 and the seal stator 224. The exemplary method 700 may include, at block 706, supplying fluid to the primary seal 230 through a plurality of aspiration conduits 236. The fluid may flow from an inlet plenum 208 to the primary seal 230 through the aspiration conduits 236. Fluid from the primary seal 230 may discharge to an outlet plenum 210. The secondary seal 242 may be impermeable to fluid. Additionally, or in the alternative, the secondary seal 242 may provide a fluid-tight seal, for example, at an interface with a portion of the seal slider 226 and/or at an interface with a portion of the seal stator 224.

Accordingly, the presently disclosed seal assemblies 202 may be implemented in any desired rotary machine 200, such as a turbine engine 100, allowing for the rotary machine 200 to be operated according to methods that include providing smooth, responsive movement of the seal slider 226, including, for example, improved responsiveness to motive forces caused by transient operating conditions of the rotary machine 200 and/or aberrant movement of the rotor 204. Exemplary methods of operating a rotary machine 200 may include moving a seal slider 226 so as to provide improved positioning of the slider face 232 relative to the rotor face 234, for example, with enhanced range of motion of the seal slider 226, and/or improved responsiveness to transient operating conditions and/or aberrant movement of the rotor 204. The presently disclosed seal assemblies 202 may be operated effectively under a wider range of operating conditions and/or with improved operating performance, including improved sealing performance of the seal assembly 202 and/or improved performance of the rotary machine 200. Additionally, or in the alternative, the presently disclosed seal assemblies 202 may be operated with a lower likelihood of contact between the slider face 232 and the rotor face 234 during transient conditions, enhancing the durability and/or useful life of the seal assembly 202, rotor 204, and/or related components of the rotary machine 200.

Further aspects of the presently disclosed subject matter are provided by the following clauses:

A seal assembly for a rotary machine, the seal assembly comprising: a seal rotor comprising a rotor face; a seal slider comprising a slider face; a seal stator, wherein the seal slider is slidably coupled to the seal stator, and wherein the seal slider is configured to slidably engage and retract the slider face with respect to the rotor face, the slider face and the rotor face defining a primary seal; and a secondary seal disposed between the seal slider and the seal stator, the secondary seal configured to compress and rebound and/or to expand and rebound, over at least a portion of a range of motion of the seal slider.

The seal assembly of any preceding clause, wherein the seal slider comprises a primary seal body and a stator-facing extension, the primary seal body defining the slider face and the seal slider slidably coupled to the seal stator at least at the stator-facing extension.

The seal assembly of any preceding clause, wherein the seal slider comprises a rotor-facing extension.

The seal assembly of any preceding clause, wherein the seal slider comprises a secondary seal flange, and wherein the secondary seal is coupled to the secondary seal flange.

The seal assembly of any preceding clause, wherein the seal stator comprises a slider flange, and wherein the secondary seal is coupled to the slider flange.

The seal assembly of any preceding clause, wherein the seal slider is slidably coupled to the seal stator at least at the slider flange.

The seal assembly of any preceding clause, wherein the secondary seal comprises a bellow seal, wherein the bellow seal is coupled to at least one of: the seal slider and the seal stator.

The seal assembly of any preceding clause, wherein the secondary seal comprises a finger seal, wherein the finger seal is coupled to at least one of: the seal slider and the seal stator.

The seal assembly of any preceding clause, comprising: one or more rebound dampers, the one or more rebound dampers respectively coupled to at least one of: the seal slider and the seal stator.

The seal assembly of any preceding clause, comprising: a tertiary seal, wherein the tertiary seal defines a tertiary seal interface between the seal stator and the seal slider.

The seal assembly of any preceding clause, wherein the tertiary seal comprises at least one of: a brush seal, a finger seal, a labyrinth seal, a lip seal, and a ring seal.

The seal assembly of any preceding clause, wherein the secondary seal comprises a secondary sealing element, the secondary sealing element comprising a stator-facing portion coupled to the seal slider and a rotor-facing portion coupled to the seal stator.

The seal assembly of any preceding clause, wherein the secondary seal comprises a secondary sealing element coupled to the seal slider at a rotor-facing portion of the secondary sealing element, wherein a stator-facing portion of the secondary sealing element is decoupled from the seal stator.

The seal assembly of any preceding clause, wherein the secondary seal comprises one or more secondary sealing elements and an intermediate flange disposed between a first one of the one or more secondary sealing elements and a second one of the one or more secondary sealing elements.

The seal assembly of any preceding clause, wherein the intermediate flange comprises a quaternary seal configured to define a quaternary seal interface with the seal stator.

The seal assembly of any preceding clause, wherein the secondary seal comprises a first secondary sealing element and a second secondary sealing element, the first secondary sealing element comprising a bellow seal and the second secondary sealing element comprising a finger seal.

The seal assembly of any preceding clause, wherein the seal assembly comprises a plurality of aspiration conduits configured to supply fluid to the primary seal.

The seal assembly of any preceding clause, wherein the plurality of aspiration conduits comprises at least one of: a plurality of slider-aspiration conduits defined by a monolithic structure of the seal slider, and a plurality of rotor-aspiration conduits defined by a monolithic structure of the seal rotor.

The seal assembly of any preceding clause, wherein the rotary machine comprises a turbine engine.

A rotary machine, comprising: a rotor; and a seal assembly disposed adjacent to the rotor, the seal assembly comprising: a seal rotor comprising a rotor face; a seal slider comprising a slider face; a seal stator, wherein the seal slider is slidably coupled to the seal stator, and wherein the seal slider is configured to slidably engage and retract the slider face with respect to the rotor face, the slider face and the rotor face defining a primary seal; and a secondary seal disposed between the seal slider and the seal stator, the secondary seal configured to compress and rebound and/or to expand and rebound, over at least a portion of a range of motion of the seal slider.

The rotary machine of any preceding clause, wherein the rotary machine comprises a turbine engine.

A method of operating a turbine engine, the method comprising: moving a seal slider in relation to a seal rotor, the seal slider comprising a slider face and the seal rotor comprising a rotor face, wherein the seal slider is slidably coupled to a seal stator, wherein the seal slider is configured to slidably engage and retract the slider face with respect to the rotor face, the slider face and the rotor face defining a primary seal; and compressing and rebounding a secondary seal and/or expanding and rebounding the secondary seal, over at least a portion of a range of motion of the seal slider, wherein the secondary seal is disposed between the seal slider and the seal stator.

The method of any preceding clause, comprising: supplying fluid to the primary seal through a plurality of aspiration conduits.

The method of any preceding clause, wherein the rotary machine comprises a turbine engine.

The method of any preceding clause, wherein the method is performed using the seal assembly of any preceding clause, and/or wherein the method is performed using the rotary machine of any preceding clause.

This written description uses exemplary embodiments to describe the presently disclosed subject matter, including the best mode, and also to enable any person skilled in the art to practice such subject matter, including making and using any devices or systems and performing any incorporated methods. The patentable scope of the presently disclosed subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A seal assembly for a rotary machine, the seal assembly comprising:
   a seal rotor comprising a rotor face;
   a seal slider comprising a slider face;
   a seal stator, wherein the seal slider is slidably coupled to the seal stator, and wherein the seal slider is configured to slidably engage and retract the slider face with respect to the rotor face, the slider face and the rotor face defining a primary seal, wherein the seal stator and the seal slider form a secondary seal plenum;
   a secondary seal disposed within the secondary seal plenum between the seal slider and the seal stator, wherein the secondary seal comprises a finger seal, wherein the finger seal is coupled to at least one of the seal slider and the seal stator, wherein the secondary seal is configured to compress and rebound or to expand and rebound and to form a seal against at least one of the seal slider and the seal stator, over at least a portion of a range of motion of the seal slider; and
   one or more rebound dampers disposed between the seal slider and the seal stator.

2. The seal assembly of claim 1, wherein the seal slider comprises a primary seal body and a stator-facing extension, the primary seal body defining the slider face and the seal slider slidably coupled to the seal stator at least at the stator-facing extension.

3. The seal assembly of claim 2, wherein the seal slider comprises a rotor-facing extension.

4. The seal assembly of claim 1, wherein the seal slider comprises a secondary seal flange, and wherein the secondary seal is coupled to the secondary seal flange.

5. The seal assembly of claim 1, wherein the seal stator comprises a slider flange, and wherein the secondary seal is coupled to the slider flange.

6. The seal assembly of claim 5, wherein the seal slider is slidably coupled to the seal stator at least at the slider flange.

7. The seal assembly of claim 1, wherein the secondary seal comprises a bellow seal, wherein the bellow seal is coupled to at least one of: the seal slider and the seal stator.

8. The seal assembly of claim 1, comprising:
   a tertiary seal, wherein the tertiary seal defines a tertiary seal interface between the seal stator and the seal slider.

9. The seal assembly of claim 8, wherein the tertiary seal comprises at least one of: a brush seal, a finger seal, a labyrinth seal, a lip seal, and a ring seal.

10. The seal assembly of claim 1, wherein the secondary seal comprises a secondary sealing element, the secondary sealing element comprising a stator-facing portion coupled to the seal slider and a rotor-facing portion coupled to the seal stator.

11. The seal assembly of claim 1, wherein the secondary seal comprises a secondary sealing element coupled to the seal slider at a rotor-facing portion of the secondary sealing element, wherein a stator-facing portion of the secondary sealing element is decoupled from the seal stator.

12. The seal assembly of claim 1, wherein the secondary seal comprises one or more secondary sealing elements and an intermediate flange disposed between a first one of the one or more secondary sealing elements and a second one of the one or more secondary sealing elements.

13. The seal assembly of claim 12, wherein the intermediate flange comprises a quaternary seal configured to define a quaternary seal interface with the seal stator.

14. The seal assembly of claim 1, wherein the secondary seal comprises a first secondary sealing element and a second secondary sealing element, the first secondary sealing element comprising a bellow seal and the second secondary sealing element comprising a finger seal.

15. The seal assembly of claim 1, wherein the seal assembly comprises a plurality of aspiration conduits configured to supply fluid to the primary seal.

16. The seal assembly of claim 15, wherein the plurality of aspiration conduits comprises at least one of: a plurality of slider-aspiration conduits defined by a monolithic structure of the seal slider, and a plurality of rotor-aspiration conduits defined by a monolithic structure of the seal rotor.

17. A turbine engine, comprising:
   a rotor; and
   a seal assembly disposed adjacent to the rotor, the seal assembly comprising:
      a seal rotor comprising a rotor face;
      a seal slider comprising a slider face;
      a seal stator, wherein the seal slider is slidably coupled to the seal stator, and wherein the seal slider is configured to slidably engage and retract the slider face with respect to the rotor face, the slider face and the rotor face defining a primary seal, wherein the seal stator and the seal slider form a secondary seal plenum;
      a secondary seal disposed within the secondary seal plenum between the seal slider and the seal stator, wherein the secondary seal comprises a finger seal, wherein the finger seal is coupled to at least one of the seal slider and the seal stator, wherein the secondary seal is configured to compress and rebound or to expand and rebound and to form a seal against at least one of the seal slider and the seal stator, over at least a portion of a range of motion of the seal slider; and
      one or more rebound dampers disposed between the seal slider and the seal stator.

* * * * *